United States Patent [19]

Sakurada et al.

[11] Patent Number: 5,394,385
[45] Date of Patent: Feb. 28, 1995

[54] OPTICAL INFORMATION RECORDING/REPRODUCING APPARATUS FOR PERFORMING POSITIONING OF RECORDING/REPRODUCING SPOT BY SELECTION OF PAIRS OF PHOTO DETECTING ELEMENTS

[75] Inventors: Takefumi Sakurada, Akishima; Naoaki Tani; Takumi Sugaya, both of Hachioji; Takao Rokutan, Higashimurayama; Mitsuo Oshiba, Hachioji; Akira Shirai, Hino, all of Japan

[73] Assignee: Olympus Optical Co., Ltd., Tokyo, Japan

[21] Appl. No.: 115,707

[22] Filed: Sep. 3, 1993

[30] Foreign Application Priority Data

Sep. 7, 1992 [JP] Japan .................................. 4-238409
Oct. 27, 1992 [JP] Japan .................................. 4-288918

[51] Int. Cl.$^6$ .............................................. G11B 7/09
[52] U.S. Cl. ................................. 369/44.23; 369/44.24; 369/44.29; 369/44.31; 369/44.38; 235/456
[58] Field of Search ........................ 369/44.23–44.24, 369/44.26, 44.29, 44.31, 44.35, 44.37–44.38, 54, 58, 44.42; 235/454, 456

[56] References Cited

U.S. PATENT DOCUMENTS

| 4,805,162 | 2/1989 | Stahl et al. | 369/44.26 |
| 4,980,882 | 12/1990 | Baer et al. | 369/44.26 X |
| 5,027,337 | 6/1991 | Takahashi et al. | 369/44.26 |
| 5,257,249 | 10/1993 | Rokutan | 369/44.26 |

FOREIGN PATENT DOCUMENTS

| 55-153139 | 11/1980 | Japan . |
| 62-279523 | 12/1987 | Japan . |
| 63-153727 | 6/1988 | Japan . |
| 3-45456 | 7/1991 | Japan . |

Primary Examiner—W. R. Young
Attorney, Agent, or Firm—Armstrong, Westerman, Hattori, McLeland & Naughton

[57] ABSTRACT

A beam-spot control unit is arranged such that a light beam is irradiated onto an optical recording medium having a plurality of tracks, through an objective lens, to detect reflecting light of beam spots formed on the tracks by three or more photo detecting elements which are arranged in a direction corresponding to a track transverse direction. From a tracking error signal which is generated by a difference signal of pairs of photo detecting elements which are selected by a selecting switch from these photo detecting elements, a control signal is generated which positions the beam spots to a plurality of recording lines within a single track. A tracking control mechanism is utilized to enable positioning of the beam spots to a plurality of recording lines within the single track to be performed.

31 Claims, 24 Drawing Sheets 450  451  456  457  453  454

OPTICAL INFORMATION RECORDING/REPRODUCING APPARATUS FOR PERFORMING POSITIONING OF RECORDING/REPRODUCING SPOT BY SELECTION OF PAIRS OF PHOTO DETECTING ELEMENTS

BACKGROUND OF THE INVENTION

FIELD OF THE INVENTION, AND RELATED ART AND PRIOR ART STATEMENT

The present invention relates to an optical information recording/reproducing apparatus for performing positioning of a recording/reproducing spot by selection of a pair of photo detecting elements with respect to an optical recording medium such as an optical card or the like.

Generally, an optical-card recording and reproducing apparatus is arranged such that an optical head is arranged in opposed relation to an optical card, and the optical card and the optical head are moved relatively to each other, whereby a light beam from the optical head is irradiated onto an information recording surface of the optical card to scan a light spot formed on the optical card in a track direction in which tracks extend, to thereby perform recording and reproducing of the information.

There are optical cards of the prior art, which include one in which it is assumed to record data along a central line of each track and one in which it is assumed to record respective data along a plurality of lines on both sides of a guide line which is arranged at a center of each of the tracks.

FIG. 1 of the attached drawings shows an arrangement of an optical system and an light-source drive system of the prior-art optical-card recording/reproducing apparatus which has a plurality of light sources. A recording light beam which is generated by a laser diode 31 is brought to a substantially elliptic parallel beam by a collimate lens 32.

The parallel beam is reduced only in a major direction of the ellipse by a shaping prism 33, and is shaped substantially into a circle. A parallel beam diameter is further reduced or throttled such that a spot size of the recording light beam is brought to a predetermined value by a circular iris or stop 34.

The circular parallel beam is so set as to be incident upon a reflecting surface of a polarizing beam splitter 35 substantially at an S-poralization, and almost all of the parallel beam is reflected. A reflected light beam is incident upon a position eccentric from an optical axis of an objective lens 36 only by a. The reflected light beam is converged onto an optical card 37 and is brought to a circular beam spot 50.

Meanwhile, a light source of a reproducing light beam is a laser diode 38 which is arranged separately from the laser diode 31 which generates the recording light beam. The reproducing light beam is brought substantially to an elliptic parallel beam by a collimate lens 39. The parallel beam is shaped substantially into a circle in which only a minor axis direction of the ellipse is enlarged by a shaping prism 40. Subsequently, a parallel beam diameter is further squeezed or throttled by a circular diaphragm or stop 41 such that a spot size of the reproduced light beam is brought to a predetermined value.

The circular parallel beam is brought to a beam in which only one direction (a direction perpendicular to a sheet surface in FIG. 1) within a vertical surface with respect to the optical axis is subject to a refracting action by a plane-concave cylindrical lens 42 so that the circular parallel beam slightly diverges in the direction. The beam which slightly diverges in one direction is so set as to be incident upon the reflecting surface of the polarizing beam splitter 35 substantially at the P-polarization. Accordingly, almost all of the beam is penetrated or transmitted through the reflecting surface of the polarizing beam splitter 35 so that the beam is incident upon a position eccentric from the optical axis of the objective lens 36 only by g, similarly to the recording light beam. The beam is condensed onto the optical card 37. Thus, the beam is brought to a beam spot 51 in the form of a slit elongated in a direction diverged by the cylindrical lens 42.

The optical card 37 is reciprocally moved in a direction indicated by the reference character D. The direction D is in parallel with a track direction along which information tracks 52 extend as shown in FIG. 2.

FIG. 2 shows the circular beam spot 50 due to the recording light beam formed on the recording surface of the optical card 37 and the beam spot 51 in the form of a slit due to the reproducing light beam. The circular beam spot 50 is formed at a center of one of the information tracks 52 on the recording surface. The beam spot 51 in the form of a slit is so formed as to span a plurality of information tracks 52 and guide tracks 53.

As shown in FIG. 1, the recording light beam and the reproducing light beam which are reflected on the optical card 37 passes through the objective lens 36 in an opposite direction and are incident upon a reflecting mirror 43. The recording light beam and the reproducing light beam which are reflected by the reflecting surface of the reflecting mirror 43 are incident upon an imaging lens 44, and are condensed onto a photo detector 45 whose plurality of light receiving elements (photo detecting elements) are arranged on a light receiving surface. An image of the light beam spot on the recording surface of the optical card 37 is formed on the light receiving surface of the photo detector 45.

The laser diode 31 is driven by a laser-diode drive circuit 46, and the laser diode 38 is driven by a laser-diode drive circuit 47. The laser-diode drive circuits 46 and 47 are operated on the basis of a signal from a light-source control circuit 49 within a controller 48 which controls operation of the whole or entire optical-card recording/reproducing apparatus. The laser-diode drive circuit 46 turns on and/or turns off the laser diode 31 with an amount of recording light emission. The laser-diode drive circuit 47 turns on and/or turns off the laser diode 38 with an amount of reproducing light emission.

FIG. 3 shows an arrangement of the photo detector 45. A plurality of light receiving elements are arranged on the light receiving surface of the photo detector 45 so that an image of the light beam spot on the recording surface of the optical card 37 is formed on the light receiving surface.

A pair of focus-detecting-light receiving elements 54 and 55 for the recording light beam, a pair of focus-detecting-light receiving elements 56 and 57 for the reproducing light beam, a pair of track-detecting-light receiving elements 58 and 59 and three (3) pit-detecting-light receiving elements 60, 61 and 62 are arranged on the photo detector 45. A spot image 63 of the recording light beam, a spot image 64 of the reproducing light beam, an image 65 of the pit formed on the information track and images 66 of the guide track are imaged respectively onto proper positions on the light receiving elements.

The focus-detection light receiving elements 54 and 55 of the recording light beam detect a shift in position of the image 63 of the recording light beam spot due to a shift in focus of the recording light beam, as a difference between the light receiving elements 54 and 55, to generate a focus detection signal of the recording light beam.

Meanwhile, the focus detecting light receiving elements 56 and 57 of the reproducing light beam detect, as a difference between the light receiving elements 56 and 57, by a differential amplifier, a shift in position of the image 64 of the reproducing light beam spot due to a shift in focus of the reproducing light beam, to generate a focus detecting signal of the reproducing light beam. The track-detecting-light receiving elements 58 and 59 of the reproducing light beam detect, as a difference between the light receiving elements 58 and 59, a shift in position of the image 66 of the guide track due to a shift in track of the reproducing light beam by a differential amplifier, to generate a track detecting signal of the reproducing light beam.

Moreover, the pit-detection light receiving elements 60, 61 and 62 detect the image 65 of a pit formed on an information track which uniquely corresponds to the pit-detecting-light receiving elements 60, 61 and 62, to generate pit detecting signals of the respective information tracks.

In such optical information recording/reproducing apparatus, wrestling has been made to further increase a storage capacity. Since, however, the prior arrangement is arranged such that a single data train is formed on a single information track, an amount of information capable of being recorded onto the optical card is prescribed or defined by a number of information tracks which can physically be arranged on the optical card. Thus, an increase in the storage capacity cannot so much be expected.

Meanwhile, prior art examples which record a plurality of data trains on a single track are disclosed also in Japanese Patent Laid-Open No. SHO 55-153139 and Japanese Patent Publication No. HEI 3-45456. In Japanese Patent Laid-Open No. SHO 55-153139, rotation of a refracting galvanometer is controlled, and in Japanese Patent Publication No. HEI 3-45456, rotation of a movable mirror is controlled, to perform positioning.

However, in the information recording and reproducing systems of the aforementioned prior art examples, an angularly moving mechanism for angularly moving the mirror and the like, or a semiconductor-laser moving mechanism for moving the semiconductor laser per se is necessary, and a control circuit is also necessary because the spots formed on the recording medium are accurately positioned respectively at a plurality of positions within a single track, and a positioning condition or state must be retained with high accuracy.

For this reason, a mechanism for the optical head and the control circuit are complicated in structure, and weight of the optical head is also heavy. Accordingly, there are a problem that moving speed of the optical head is reduced so that it takes time to access, and a problem that a price of a recording unit which uses the optical head rises.

Meanwhile, FIG. 4 shows the optical card whose structure is capable of recording a plurality of information on a single track.

The optical card has an information recording surface thereof which is formed with a plurality of tracks 403 as shown in FIG. 4. A center of the tracks 403 is provided with guide patterns 402a which extend in a track direction for performing tracking servo control and focus servo control. Each of the guide patterns 402a has both sides thereof which are provided with total eight (8) lines from a data line 1 (L1) to a data line 8 (L8) for recording data.

Furthermore, each of the guide patterns 402a uses together also function of a clock pattern for taking synchronism when writing and reading of the data are performed. The clock pattern is such that portions indicated by white and black are different in reflection level from each other, and a detected signal is binary-coded whereby there can be provided a clock signal for synchronization.

FIG. 5 shows the relationship between an photo detector under a condition positioned on an objective track and the recording medium imaged on the optical detector, to which the focus servo control and the tracking servo control are applied.

A signal of the focus servo and a signal of the tracking servo are generated on the basis of an output from a cell C1 (481) to a cell C4 (484) and a cell D1 (485) to a cell D4 (488) within the optical detector so that the focus control and the tracking control are performed. Upon controlling, the cell C1 (481) to the cell C4 (484) and the cell D1 (485) to the cell D4 (488) are positioned on the guide patterns 402a. Further, since there are provided a plurality of clock cells 489, it is possible to reliably perform detection of the clock from the guide patterns 402a.

Moreover, reading cells 490 arranged sixteen (16) irradiate a data reading beam 480 to the track 403, whereby it is possible to read simultaneously eight (8) line data and eight (8) line data respectively on both sides of the guide pattern 402a, or sixteen (16) line data in sum.

Furthermore, a data writing beam 491 is irradiated only upon data writing, and it is possible to perform writing every one line. At this time, the data writing beam 491 must be positioned on a writing objective line.

A system for recording information onto such optical card in which the plurality of tracks 403 having the guide patterns 402a extending in the track direction and the data lines 1 (L1)~8 (LB) provided on the both sides of the guide patterns 402a as described above are gathered is disclosed in Japanese Patent Laid-Open No. SHO 63-153727, Japanese Patent Laid-Open No. SHO 62-279523 or the like.

According to Japanese Patent Laid-Open No. SHO 63-153727, a single semiconductor laser is used as a recording light source, and a recording beam due to the semiconductor laser scans in the track widthwise direction by angular movement of a mirror by bimorph or the like, to write information onto a single track of the optical card over a plurality of lines, to thereby raise recording density with respect to the single track.

Further, according to Japanese Patent Laid-Open No. SHO 62-279523, a recording element (semiconductor laser) per se is moved in a track widthwise direction, whereby a recording beam is displaced in the track widthwise direction, to thereby write information over a plurality of lines of a single track.

For this reason, a mechanism of the optical head and a control circuit are complicated in structure as described previously, and weight of the optical head increases. Accordingly, there are problems that moving speed of the optical head decreases so that time is taken for accessing, and a cost of the recording apparatus which uses the optical head increases.

OBJECTS AND SUMMARY OF THE INVENTION

It is an object of the invention to provide an optical information recording/reproducing apparatus which can position a light beam onto a desired recording line of a recording medium, and which can retains the positioning condition or state to perform recording of information, by a simple arrangement.

It is an another object of the invention to provide an optical information recording/reproducing apparatus which can reduce weight of an optical head, and which can improve accessing speed.

It is an other object of the invention to provide an optical information recording/reproducing apparatus having function of high-order compatibility in which even a recording medium in which recording is made onto a single track in a plurality of data trains can cope with any of recording media which are recorded onto a single track in a single data train.

According to the invention, there is provided an optical information recording and reproducing apparatus which comprises a beam-spot control unit which includes:

a light source for generating a light beam;

a beam irradiating optical system for irradiating the light beam to an optical recording medium having a plurality of information tracks to form a beam spot on the information tracks;

photo detecting means arranged in a corresponding direction corresponding to a track cross or transverse direction traversing the information tracks and having photo detecting elements which receive returning light from the beam spot at a plurality of positions equal to or more than three which are different from each other;

positioning-signal generating means for generating a positioning signal for performing positioning to a plurality of reference positions in the track transverse direction within the information track on the basis of an output from the photo detecting means; and position setting means for controlling the beam irradiating optical system by a positioning signal to set a beam spot position formed on the information track through the beam irradiating optical system, to an optional position of the plurality of reference positions.

With the above arrangement of the beam spot control unit according to the invention, the photo detecting elements are selected by the beam-spot control unit without the necessity that the light beam is moved actively, whereby an objective lens or the like can be controlled by a shift in position signal or a deviation signal from a reference position generated by an output from the selected photo detecting element, to set and retain a beam spot position to an optional reference position.

BRIEF DESCRIPTION OF THE DRAWINGS

FIG. 7 is a view showing an arrangement of a photo detector, an arrangement of a focus- & track-error-signal generating circuit, and the like, which are used in the first embodiment;

FIG. 8 is an explanatory view showing an image of a light beam spot (on a recording surface of the optical card) which is formed on a light receiving surface of a photo detector in a case where recording is performed by a single data train/a single information track;

FIG. 9 is an explanatory view showing the image of a light beam spot on the recording surface of the optical card which is formed on the light receiving surface of the photo detector in a case where the data train in a case of being recorded by two data trains/the single information track is shifted rightwardly from a center of the information track;

FIG. 10 is an explanatory view showing the image of a light beam spot on the recording surface of the optical card which is formed on the light receiving surface of the photo detector in a case where the data train in a case of being recorded by the two data train/the single information track is shifted leftwardly from the center of the information track;

FIG. 11 is an explanatory view showing an example of a pit train which is formed on the optical card in a case where data are recorded by a single data train/a single information track and two data trains/a single information track;

FIG. 12 is a flow chart showing handling or treatment contents of a light-source control unit of recording operation;

FIG. 14 is an explanatory view showing a light beam spot formed on an optical card;

FIG. 15 is a view showing the positional relationship of a track with respect to an image of the light beam spot on a recording surface of an optical card which is formed on a light receiving surface of a photo detector and an arrangement of a focus- & track-error-signal generating circuit;

FIG. 18 is an arrangement view showing an arrangement of an optical head;

FIG. 19a is an arrangement view showing an arrangement of a photo detector;

FIG. 19b is an explanatory view showing cells which are selected in a case where a light beam is positioned on a first data line;

FIG. 20 is an explanatory view describing the relationship of cells of a photo detector and a guide pattern;

FIG. 21 is an arrangement view showing an arrangement of a detector selecting circuit;

FIG. 22 is an explanatory view describing a state or condition under which a light beam is positioned on a fifth data line;

FIG. 23 is an explanatory view describing a state under which the light beam is positioned on the first data line;

FIG. 24 is an explanatory view describing a state under which the light beam is positioned on a eighth data line;

FIG. 25 is an explanatory view describing a tracking error signal;

DETAILED DESCRIPTION OF THE PREFERRED EMBODIMENTS

Figure 6:
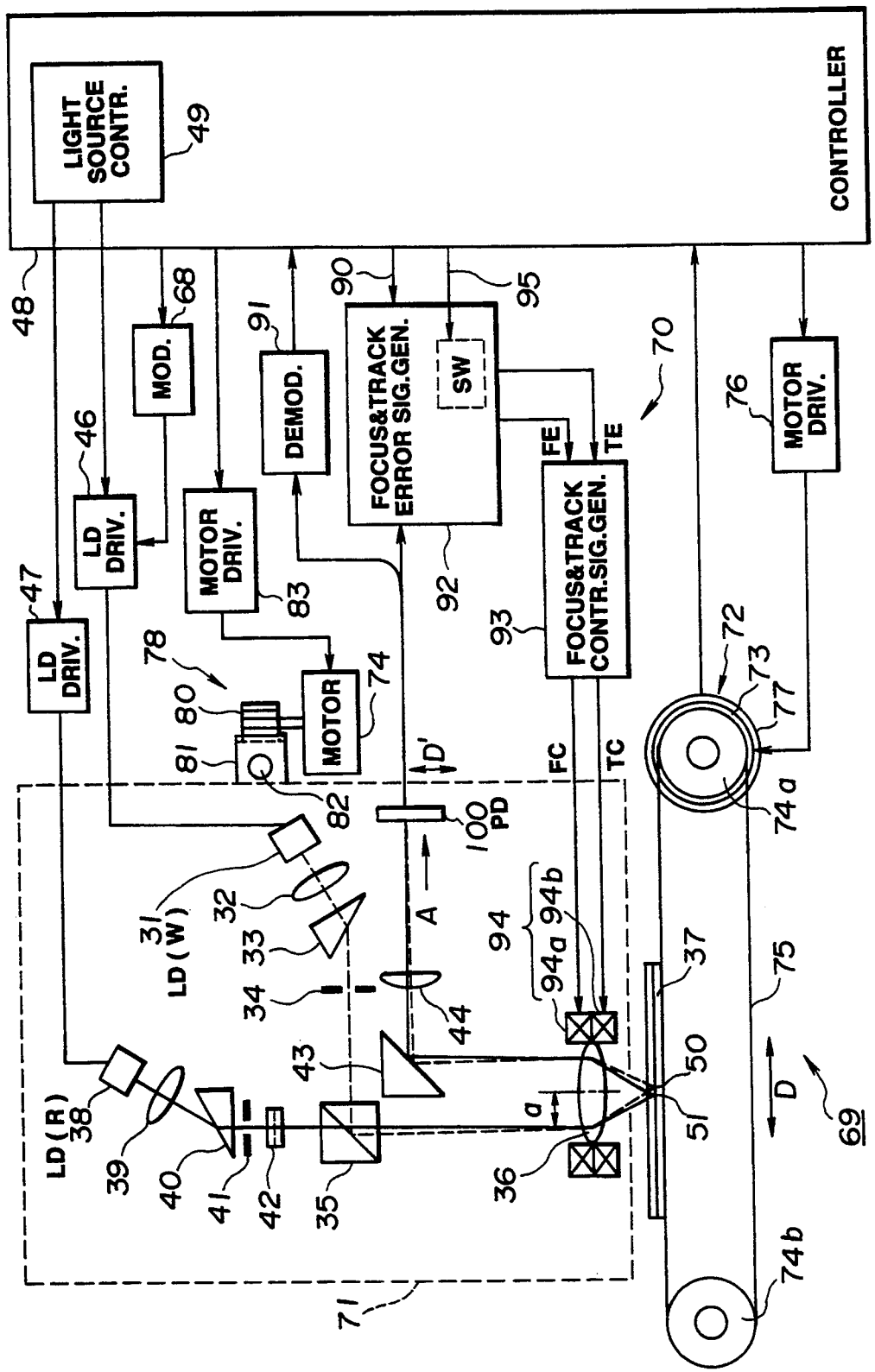
FIGS. 6 to 12 relate to a first embodiment of the invention, FIG. 6 being a view showing an arrangement of an optical system and a light-source drive system of an optical-card recording/reproducing apparatus according to a first embodiment of the invention.

A first embodiment of the invention will hereunder be described with reference to FIGS. 6 to 12. FIG. 6 shows an optical-card recording/reproducing apparatus 69 according to the first embodiment of the invention.

The embodiment comprises a spot-position control unit 70 capable of positioning a light beam spot used for recording, to a central position on a line which bisects a track width of an information track, and capable of positioning the light beam spot to a plurality of divided positions at which two lines in a case where the track width is trisected, for example, are positioned. The spot-position control unit 70 enables recording and reproducing on a normal single train/a single information track to be performed, and also enables recording and reproducing on two data trains/a single information track to be performed.

Figure 1:
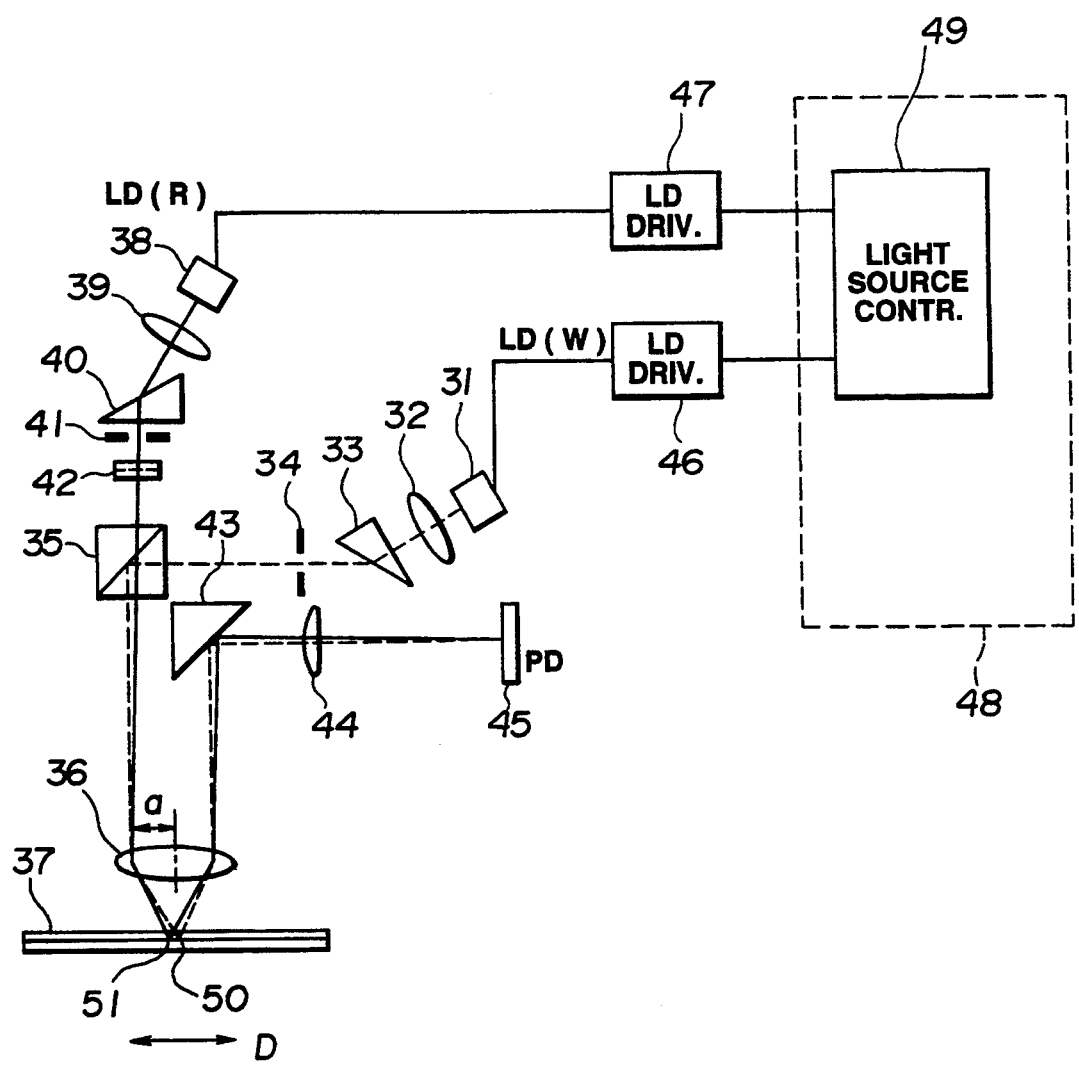
FIG. 1 is a view showing an arrangement of an optical-source drive system and an optical system of a two-light-source optical-card recording/reproducing apparatus according to a prior art.

The optical-card recording/reproducing apparatus 69 according to the first embodiment comprises an optical head 71 which uses a plurality of light sources similarly to the prior art illustrated in FIG. 1. That is, a recording light beam generated by a laser diode 31 is irradiated on an optical card 37 through an optical system such as a collimate lens 32 or the like and an objective lens 36, to form a minute beam spot 50 on the optical card 37.

Further, a reproducing light beam generated by a laser diode 38 is irradiated upon the optical card 37 through an optical system such as a collimate lens 39 or the like and the objective lens 36, to form a beam spot 51 in the form of a slit on the optical card 37.

In the present embodiment, optical axes of the laser diodes 31 and 38 are included in a sheet surface of FIG. 6. Centers of the respective beam spots 50 and 51 are located respectively at positions which are slightly shifted or deviated horizontally in the sheet surface. The beam spot 51 extends in a vertical direction of the sheet surface with the sheet surface serving as a center, so as to be brought to a slit-like configuration.

In FIG. 6, the optical card 37 is formed with tracks in the form of a line extending in parallel with the sheet surface.

Accordingly, the centers of the respective beam spots 50 and 51 are formed in shift in a direction (referred to as "track direction") in which the tracks extend. Moreover, the beam spot 51 extends in the form of a slit in a direction (referred to as "track transverse direction") extending perpendicularly to the tracks.

The laser diodes 31 and 38 are controlled in light quantity by a light-source control circuit 49, and emit light through laser-diode drive circuits 46 and 47. The laser diode 38 which generates a reproducing light beam is controlled by an APC circuit. The laser diode 31 which generates a recording light beam is normally turned off and is turned on at a high light emission level capable of forming a pit by a modulation signal from a modulation circuit 68 upon recording operation.

Recording data transmitted from the side of a high-order controller through a controller 48 are inputted to the modulation circuit 68.

The beam spots 50 and 51 are reflected by the recording surface of the optical card 37, and pass through the objective lens 36, a reflecting mirror 43 and an imaging lens 44 to focus into images of the beam spot 50 and 51 onto the photo detector 100. A central position of the images of the beam spots 50 and 51 focused on the photo detector 100 is imaged to a position which is slightly shifted vertically within the sheet surface in FIG. 6. Accordingly, a direction D in parallel with a track direction illustrated in FIG. 6 is a direction indicated by the reference character D' in a photo detector 100.

The optical system of the optical head 71 illustrated in FIG. 6 is the same as the optical system shown in FIG. 1 except the photo detector 100. The same or identical reference numerals are applied to the same or identical constitutional parts or elements, and the description thereof will be omitted.

The optical card 37 is reciprocally carried in the direction D which is parallel with the track direction, by an optical-card carrying mechanism 72. The optical-card carrying mechanism 72 comprises a driving motor 73, one roller 74a mounted on a rotary shaft of the driving motor 73 and the other roller 74b arranged in spaced relation to the roller 74a, and a belt 75 which passes round the rollers 74a and 74b and on which the optical card 37 rests. A positive drive signal which rotates the motor 73 through a motor drive circuit 76 in a clockwise direction is applied whereby the optical card 37 is carried rightward in the horizontal direction, while a negative drive signal is applied whereby the optical card 37 is carried to the left.

An amount or quantity of carrying of the optical card 37 is detected by a rotary encoder 77 which is mounted on the rotary shaft of the motor 73, and is outputted to the controller 48.

A direction in which the optical card 37 is carried is the direction D which is in parallel with a longitudinal direction of the optical card 37. Accordingly, a direction in which the optical card 37 is carried is in parallel with a track direction in which the tracks extend.

The optical-card carrying mechanism 72 is controlled by the controller 48. The optical head arranged in opposed relation to the optical card which rests on the optical-card carrying mechanism is movable in a track transverse direction which extends perpendicularly to the track direction, by a head feed mechanism 78. The optical head 71 is moved in the track transverse direction by the head feed mechanism 78, to thereby be accessible to an optional track.

The head feed mechanism 78 comprises a driving motor 79, a gear 80 mounted on a rotary shaft of the driving motor 79, and a shaft 82 which is formed with a rack portion 81 in mesh with the gear 80 and which is mounted on a housing of the optical head 71 so as to be supported movably.

Positive and negative drive signals are supplied to the motor 79 from a motor drive circuit 83 to move the optical head 71 in directions opposite to each other in accordance with the positive and negative drive signals. The head feed mechanism 78 is also controlled by the controller 48.

The photo detector 100 which is housed within the optical head 71 and which is arranged at a position which receives an image of the beam spot due to the imaging lens 44 has a plurality of light receiving elements which are different from those of the prior art.

An output signal from the photo detector 100 is inputted to a modulation circuit 91 and a focus- & track-error-signal generating circuit 92. By the modulation circuit 91, a modulated reproducing signal is inputted to the controller 48. The controller 48 transmits the reproducing signal to the side of a high-order controller (not shown).

The focus- & track-error-signal generating circuit 92 generates a focus error signal FE and a track error signal TE from the output from the photo detector 100, and outputs them to a focus- & track-control-signal generating circuit 93.

The focus- & track-control-signal generating circuit 93 generates a focus control signal FC for performing focus control from the focus error signal FE and a track control signal TC for performing track control from the track error signal TE, to respectively output the focus control signal FC and the track control signal TC to a focus coil 94a and a tracking coil 94b which form an actuator 94 for driving the objective lens 36, to thereby maintain the light beam spot formed on the optical card 37 under a focus condition and a tracking condition.

Figure 8:
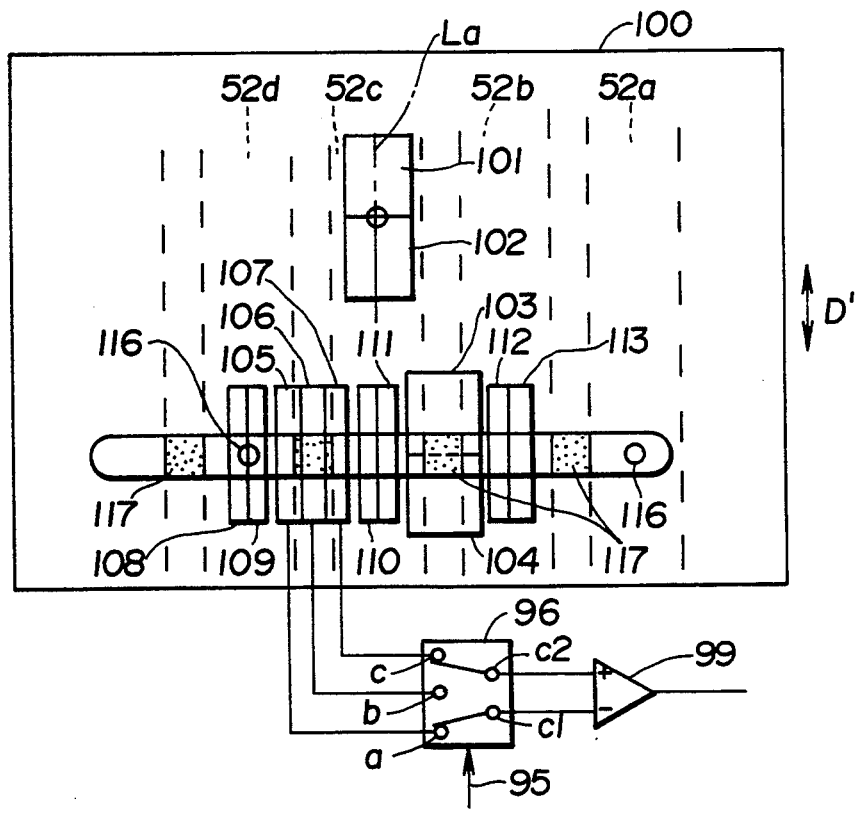
Figure 9:
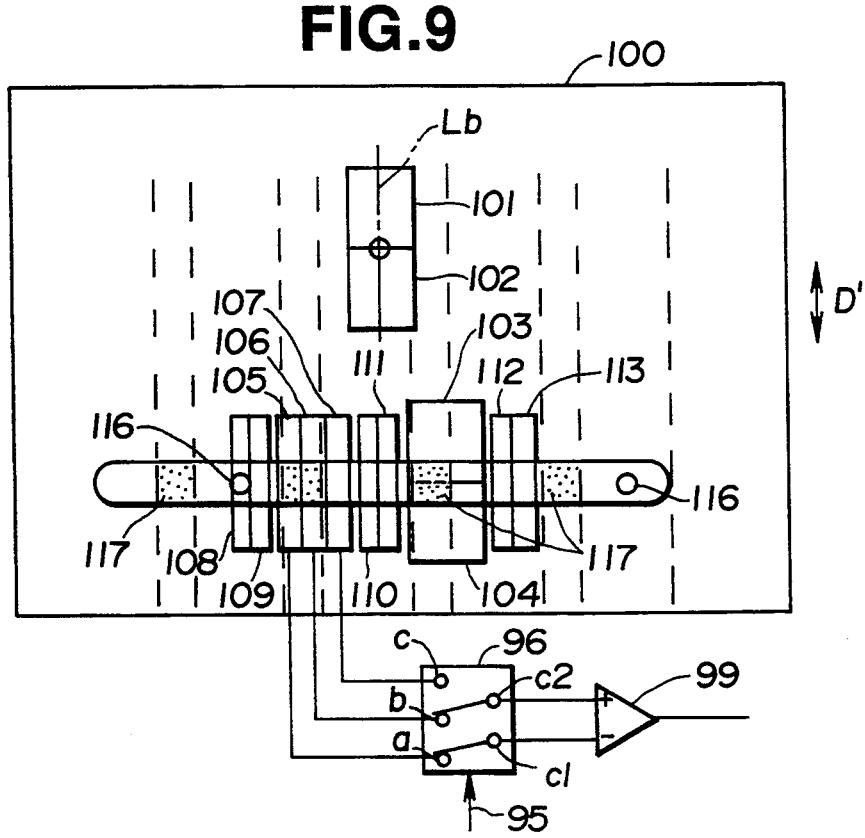
Figure 10:
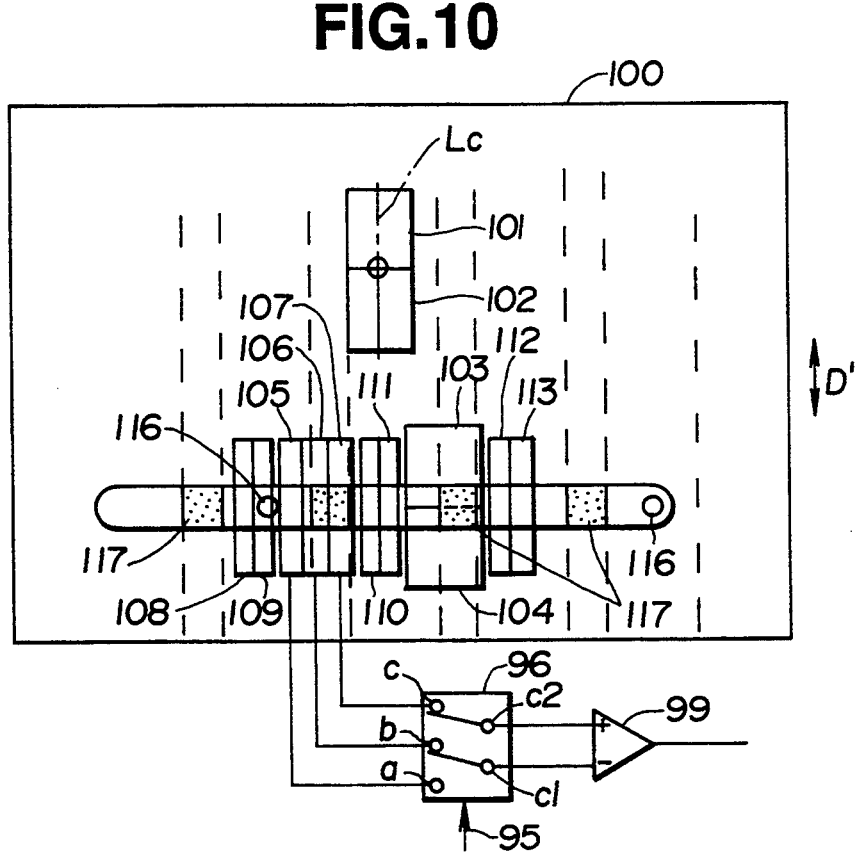

The first embodiment comprises a tracking light receiving element for performing normal tracking control, that is, a tracking light receiving element for positioning a beam spot formed on the information track onto a position on a central line of the information track (the position on the central line which serves as a reference in FIG. 8 is indicated by La), in addition thereto, a tracking light receiving element for positioning the beam spot formed on the information track onto a position on a plurality of dividing lines within the information track (positions of right-of-center and left-of-center lines which serve as references in FIGS. 9 and 10 are indicated by Lb and Lc, respectively).

That is, the first embodiment is characterized by comprising tracking light receiving elements arranged in pair for detecting a shift or deviation amount from a central line (of information track) of the beam spot and, in addition thereto, further, a tracking light receiving element for detecting a shift or deviation amount from the plurality of dividing lines within the information track width of the beam spot; and these light receiving elements (equal to or more than three) are switched by a selecting signal 95 and two of the light receiving elements are selected to generate the track control signal TC, whereby the beam spot can be positioned on either reference position of the central line or the eccentric dividing line positions.

In the present embodiment, the spot-position control unit 70 for performing positioning to a plurality of reference positions within the information track comprises the optical head 71, the focus- & track-error-signal generating circuit 92, the focus- & track-control-signal generating circuit 93, and selecting means of a switch 96 within the focus- & track-error-signal generating circuit 92.

Figure 3:
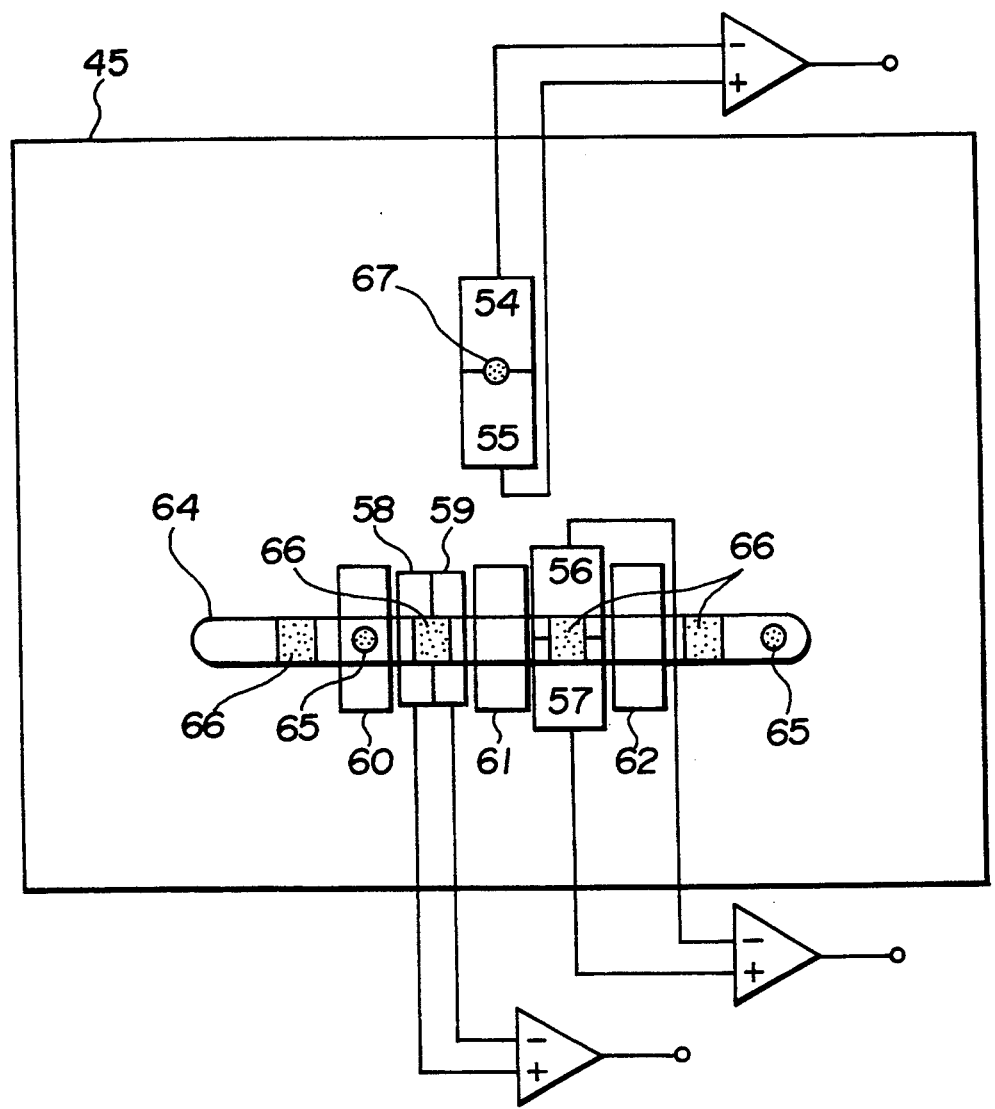
FIG. 3 is an explanatory view showing a photo detector which is used in the optical-card recording/reproducing apparatus illustrated in FIG. 1.

In the prior art illustrated in FIG. 3, the spot-position control unit 70 is substantially similar to an arrangement in which the light receiving elements 58 and 59 in the photo detector 45 are replaced with three (3) light receiving elements 105, 106 and 107, and selecting means is provided for selecting two of these light receiving elements by the switch 96.

That is, in a normal apparatus (an apparatus which performs recording by a single data train/a single information track) provided with tracking control means due to a first light receiving element for performing tracking of the light spot to a single reference position (normally, a position of a central line) within the information track, the spot-position control unit 70 is formed by providing with one or more second light receiving elements for performing setting to further another reference position and selecting means for selecting first and second light receiving elements, to thereby be capable of performing recording by a plurality of data trains/a single information track.

Furthermore, in the present embodiment, focus control is performed on the basis of recording light upon recording, and is performed on the basis of reproducing light upon reproducing. For this reason, a focus error signal used is selected by a W/R signal 90 which expresses a recording or reproducing mode.

Figure 7:
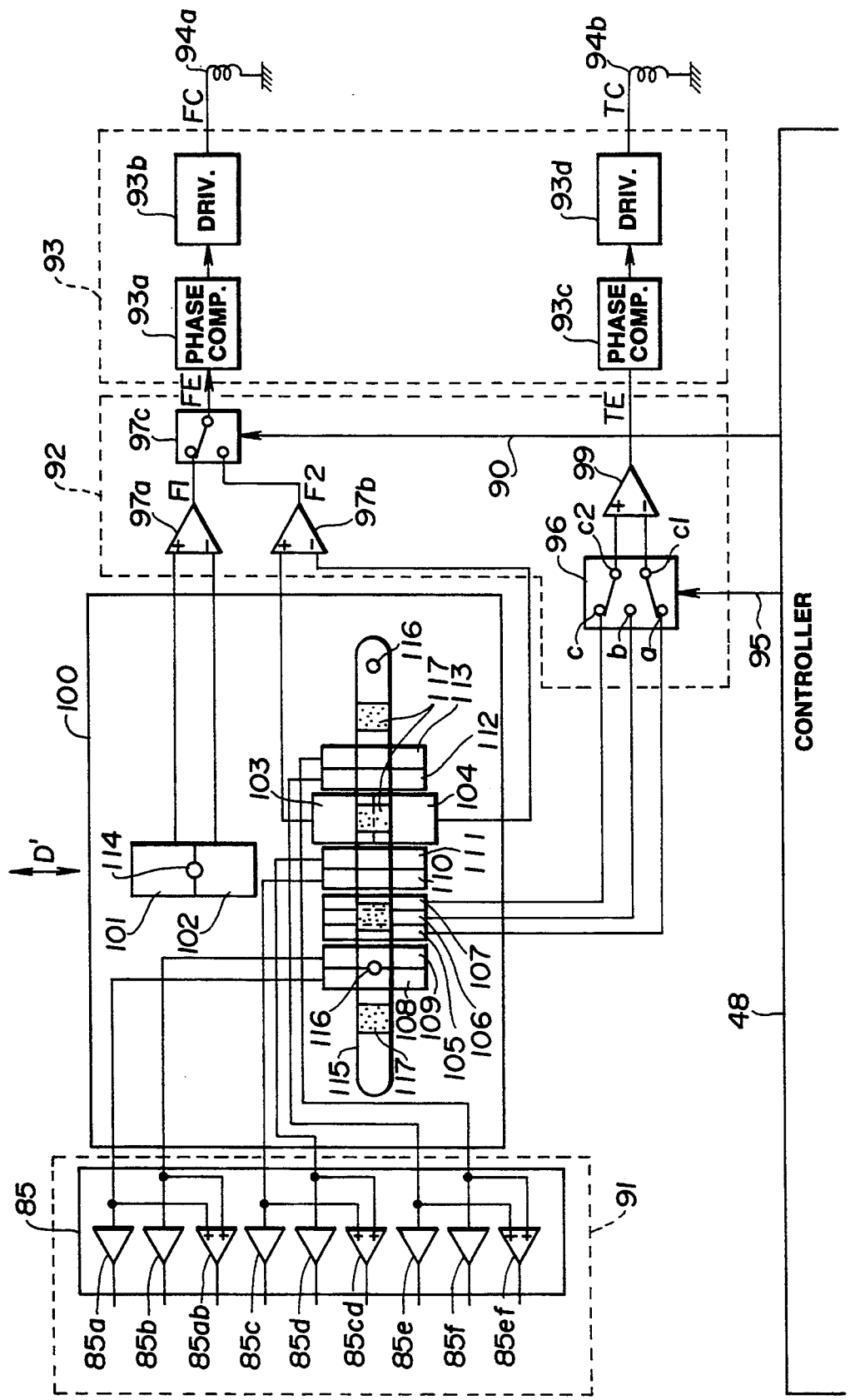

FIG. 7 shows light receiving elements 101~113 in the photo detector 100 for generating the above-mentioned error signal, under a condition in which an image of the beam spot is formed, and is equivalent to a front elevational view as viewed from a direction indicated by A in FIG. 6. A direction vertical to a sheet surface in FIG. 6 is a horizontal direction in FIG. 7.

As shown in FIG. 7, an image 114 of the light beam spot 50 on the recording surface of the optical card 37 and an image 115 in the form of a slit of the light beam spot 51 are focused on the light receiving surface of the photo detector 100. The plurality of light receiving elements 101~113 are arranged at positions where these images 114 and 115 are focused.

That is, the focus-detecting-light receiving elements 101 and 102 for the recording light beam, the focus-detecting-light receiving elements 103 and 104 for the reproducing light beam, the tracking-light receiving elements 105, 106 and 107 used for positioning in the track transverse direction, and the pit-detecting-light receiving elements 108, 109, 110, 111, 112 and 113 are arranged on the photo detector 100. The spot image 114 of the recording light beam, the spot image 115 of the reproducing light beam, an image 116 of the pit formed on the information track, and an image 117 of the guide track are focused to proper positions on the light receiving elements.

The focus-detecting-light receiving elements 101 and 102 for the recording light beam are provided for detecting a shift in position of the image 114 of the recording light beam spot due to the focus shift of the recording light beam. The focus detecting light receiving elements 101 and 102 for the recording light beam are formed adjacent to each other vertically. Outputs from the respective two light receiving elements 101 and 102 detect a difference by a difference amplifier 97a to generate a focus error signal F1 of the recording light beam. FIG. 7 shows a focus condition. When a condition is brought to a defocus condition, a position of the image 114 of the recording light beam spot is moved upwardly or downwardly. In this case, the focus error signal F1 is positive or negative.

Meanwhile, the focus detecting light receiving elements 103 and 104 for the reproducing light beam are provided for detecting a shift in position of the image 115 of the reproducing light beam spot due to the focus shift of the reproducing light beam. The focus detecting light receiving elements 103 and 104 for the reproducing light beam detect a difference between the light receiving elements 103 and 104 by a differential amplifier 97b, to generate a focus error signal F2 of the reproducing light beam. Of these two focus error signals F1 and F2, a signal selected by a switch 97c is inputted to a focus- & track-control-signal generating circuit 93 as a focus error signal FE.

The focus error signal FE is brought to a focus control signal FC through a phase compensating circuit 93a for performing phase compensation and a drive circuit 93b for amplifying current. The focus error signal FE is applied to a focus coil 94a and controls a position of the objective lens 36 in an optical-axis direction, to retain a focus condition in which a beam spot formed on the optical card 37 is minimized.

Further, the tracking-light receiving elements 105, 106 and 107 of the reproducing light beam are formed in three division in a horizontal direction (the horizontal direction corresponds to a track transverse direction) in which a slit of the image 115 (of the beam spot 51) extends. These light receiving elements 105, 106 and 107 are connected to contacts a, b and c of the switch 96, respectively, and two contacts are so selected as to be conducted respectively upon the common contacts c1 and c2 in accordance with a selecting signal 95 from the controller 48. Outputs from the respective selected two light receiving elements are brought to track error signals TE of the reproducing light beam, through the differential amplifier 99, and is inputted to the focus- & track-control-signal generating circuit 93. Combination of the selected pair of light receiving elements is three including light receiving elements 105 and 107; 105 and 106; and 106 and 107 as shown in FIGS. 8 to 10.

The track error signal TE passes through a phase compensating circuit 93c for performing phase compensation and a drive circuit 93d for performing current amplification and is brought to a track control signal TC. The track control signal TC is applied to a track coil 94b. The track control signal TC controls the objective lens 36 to a position along the track transverse direction, and maintains a tracking condition in which the beam spot formed onto the optical card 37 traces the central line of the information track or the like.

Control in position of the objective lens 36 in the track transverse direction is performed by the track control signal TC on the basis of the track error signal TE which is formed by the light receiving element selected by the selecting signal 95, whereby positions of the beam spots 50 and 51 (in the track transverse direction) irradiated upon the optical card 37 are controlled.

Specifically, in a case where the image of the beam spot 51 is located at the central position of the information track as illustrated in FIG. 8, for example, the light receiving elements 105 and 107 are arranged in a direction corresponding to the track transverse direction such that light amounts received respectively by the light receiving elements 105 and 107 are equal to each other. Further specifically, a reflecting light amount at the guide track section which receives light by the light receiving element 105, and a reflecting light amount at the guide track section which receives light by the light receiving element 107 are equal to each other. A reflecting light amount at the information track section which receives light by the light receiving element 105 and a reflecting light amount at the information track section which receives light by the light receiving element 107 are equal to each other (as is well known, the reflectance at the information track section and the reflectance at the guide track section are different from each other).

The light receiving elements 105 and 107 perform directly positioning of the beam spot 51. Regarding the track transverse direction, however, since the central position of the slit in the beam spot 51, for example, is equal to the position of the beam spot 50, the light receiving elements 105 and 107 can also be used to position the beam spot 50.

By the positioning control, upon recording operation, it is possible to select a first mode performing recording so as to become a single data train on a single track, and a second mode performing recording so as to become two data trains on a single track.

Similarly, also upon reproducing operation, it is possible to select a first mode in which recording data are read from a recording medium in which a single data train is formed on a single track, and a second mode in which recording data are read from a recording medium in which two data trains are formed on a single track.

Further, the pit detecting light receiving elements 108 and 109; 110 and 111; and 112 and 113 each of which is divided into two to form a pair are so arranged as to be capable of detecting images of the pits which are recorded in two rows on each adjacent tracks.

Under a tracking condition due to selection of the tracking light receiving elements 105 and 107 as shown, for example, in FIG. 8, the pair of pit detecting light receiving elements 108 and 109 are arranged at a position which receives an information track image 52d under a condition in which the dividing line of the pair of pit detecting light receiving elements 108 and 109 is in agreement with a line which bisects the information track image 52d indicated by the broken line in FIG. 8, in a track direction. The other pair of pit detecting light receiving elements 110 and 111 are brought to a similar arrangement condition with respect to an information track image 52c which is located adjacent to the information track image 52d. The pair of pit detecting light receiving elements 112 and 113 are so arranged as to be a similar arrangement condition with respect to the information track image 52d adjacent to the information track image 52c.

Figure 2:
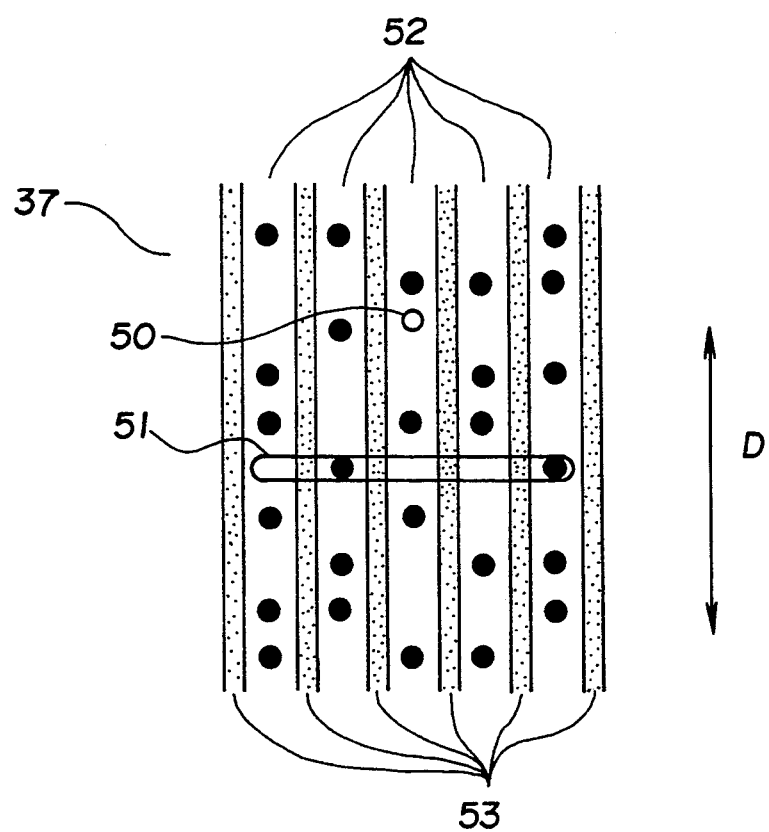
FIG. 2 is an explanatory view showing an light beam spot which is formed on an optical card by the optical-card recording/reproducing apparatus illustrated in FIG. 1.

Under the tracking condition, the beam spot 50 due to the recording beam is positioned to a central line position of the information track 52 as shown in FIG. 2. Accordingly, in this case, it is possible to perform recording of a single data train/a track. As shown in FIG. 8, an image of the beam spot 50 is positioned on an extension of the dividing line of the pair of pit detecting light receiving elements 110 and 111.

Outputs from the respective pit detecting light receiving elements 108, 109, 110, 111, 112 and 113 are inputted to buffer amplifiers 91a~91f which form a buffer circuit 85 within the modulation circuit 91, so as to be capable of detecting pits, in parallel therewith, which are recorded respectively in two rows on the adjacent three (3) tracks.

Moreover, outputs from the pair of pit detecting light receiving elements 108 and 109 (or 110 and 111 or 112 and 113) are added to each other by an addition amplifier 85ab (or 85cd or 85ef) so as to be capable of detecting the pits, in parallel therewith, which are recorded a single row by a single row, respectively, on the adjacent three (3) tracks. That is, in a case where the modulation circuit 91 detects the data recorded along the center line of each track, the modulation circuit 91 selects the outputs from the respective addition amplifiers 85ab, 85cd and 85ef.

Furthermore, the other tracking light receiving elements are selected, whereby it is possible to perform positioning to a line which is different from the central line of the track. Thus, it is possible to record the data on the line.

In the first embodiment, the optical head 71 is not provided with means for moving the light beam actively in the track transverse direction in the prior art, but the optical detector 100 is provided with the position detecting means for performing detection of the position of the beam spot in the track transverse direction, and an output from the position detecting means is applied to the track coil 94b to perform positioning of the beam spot.

That is, the tracking control mechanism is utilized to perform positioning of the beam spot in the track transverse direction. Accordingly, the positioning of the prior art is made possible by a substantial increase in the number of light receiving elements more than those in the prior art and the provision of a selecting switch which selects the pair of light receiving elements which are used for positioning. For this reason, the arrangement of the optical head is brought to an arrangement substantially the same as a normal optical head (optical head illustrated in FIG. 1, for example) having no means for moving the light beam actively in the track transverse direction except the photo detector. The arrangement of the optical head is reduced in weight and is not raised in cost.

Moreover, in the prior art, it becomes difficult to retain a positioned condition, whereas, in the present embodiment, since control is performed by a feed-back circuit, it is made easy or facilitated to retain the positioned condition.

Next, operation in which the information track is center-lied, shifting is made from a center line to perform positioning to a plurality of recording lines, and tracking holding or retention is made on these lines to perform recording will hereunder be described with reference to FIGS. 8, 9 and 10.

FIG. 8 shows an image of an light beam spot on the recording surface of the optical card 37 which is formed on the light receiving surface of the photo detector 100 in a case of being recorded in the existing mode of a single data train/a single information track. Since the mode is a mode recorded by the existing single data train/the single information track arrangement, the mode can be used in a case where data are additionally recorded by the same format on the existing optical card (optical card in which data have already been recorded onto a partial track by the single data train/the single information track arrangement, for example). That is, the mode can be used as a recording unit of the existing single data train/the single information track arrangement (of course, can also be used as a reproducing unit of the existing single data train/the single information track arrangement).

Furthermore, the mode should be used in a case of being recorded by the single data train/the single information track arrangement the same as the existing optical card so as to be capable of being recorded or reproduced also by the existing recording/reproducing apparatus.

In a case where the data recording is performed by the mode, the tracking light receiving elements 105 and 107 are selected as tracking light receiving elements as shown in FIGS. 7 and 8 to perform tracking control. A pit is formed under a condition in which the recording light beam spot is maintained at the central position of the information track (in the track width) indicated by a broken line, as shown in FIG. 8.

FIG. 9 shows a case recorded by a mode of two data train/a single information track, and illustrates an aspect in which an image of the beam spot 50 is positioned on the recording line which is shifted rightwardly from the center of the information track, in the form of an image of the light beam spot on the recording surface of the optical card 37 which is formed on the light receiving surface of the photo detector 100.

In this case, the tracking light receiving elements 105 and 106 are selected as tracking light receiving elements upon data recording, to perform tracking control to thereby form a right-of-center pit of the information track.

FIG. 10 shows similarly a case recorded by a mode of two data trains/a single information track, and illustrates an aspect in which an image of the beam spot 50 is positioned on the recording line which is shifted leftwardly from the center of the information track, in the form of an image of the light beam spot on the recording surface of the optical card 37 which is formed on the light receiving surface of the photo detector 100.

In this case, tracking control is performed while the tracking light receiving elements 106 and 107 are selected as tracking light receiving elements upon data recording, to form a left-of-center pit of the information track.

Upon data recording, the controller 48 receives a command from a host computer (not shown) which is connected to an optical-card recording/reproducing apparatus. Subsequent processing or treatment is recording operation of the information. Once the controller 48 judges where position on the information track the data train is formed, the controller 48 selects each of the tracking light receiving element as described previously, to perform switching so as to perform tracking control. Hereunder, data are recorded onto the optical card in accordance with a processing flow illustrated in FIG. 11.

That is, the light-source control circuit 49 receives a command from the host computer (not shown) which is connected to the optical-card recording/reproducing apparatus 69, to judge whether or not the subsequent processing is information recording as shown in Step S1.

Meanwhile, if it is judge as being the recording operation as shown in Step S2, the light-source control circuit 49 causes the laser-diode drive circuit 46 to generate a signal in keeping with movement of the recording medium, on the basis of the recording information which is sent through the controller 48. The laser-diode drive circuit 46 turns on and off the laser diode 31 by the recording light emission amount in accordance with the signal. Thus, information recording processing which records the information onto the recording medium is performed as indicated in Step S3.

As shown in Step S4, the laser diode 31 is turned off after the recording operation has ended. In the judgment of Step S1, in a case of being judged as being other than the recording operation, the laser diode 31 does not emit light.

Upon data reproducing, in a case of the two data train/the single information track arrangement, tracking control is performed as shown in FIG. 8. Thus, it is possible to read, in a lump, the plurality of data trains by the plurality of pit detecting light receiving elements which uniquely correspond to and are arranged on each of the data trains. Moreover, as shown in FIG. 8, in a case where the pit train is a data train positioned on a center, that is, is a single data train/a single information track arrangement, detection is made by a sum signal of the pit detecting light receiving elements 108 and 109, to generate a pit detecting signal.

That is, in a case where data reproduction is performed by a mode of a single data train/a single information track arrangement, the tracking light receiving elements 105 and 106 are selected as tracking light receiving elements, to perform tracking control. The pit detecting light receiving elements 108, 109, 110, 111,112 and 113 which detect the pit formed at a center of the information track performs pit detection by pairs of sum outputs from the pit detecting light receiving elements 108 and 109, 110 and 111, and 112 and 113.

Further, the data train in which the pit train shifts rightwardly, for example, may perform detection by the pit detecting light receiving element 113 under a tracking condition as illustrated in FIG. 9 to generate the pit detecting signal, in a case of aiming at the pit detecting light receiving elements 112 and 113. Similarly, the data train in which the pit train shifts leftwardly may perform detection by the pit detecting light receiving element 112 under a tracking condition as illustrated in FIG. 10 to generate the pit detecting signal, in a case of aiming at the pit detecting light receiving elements 112 and 113.

Figure 12:
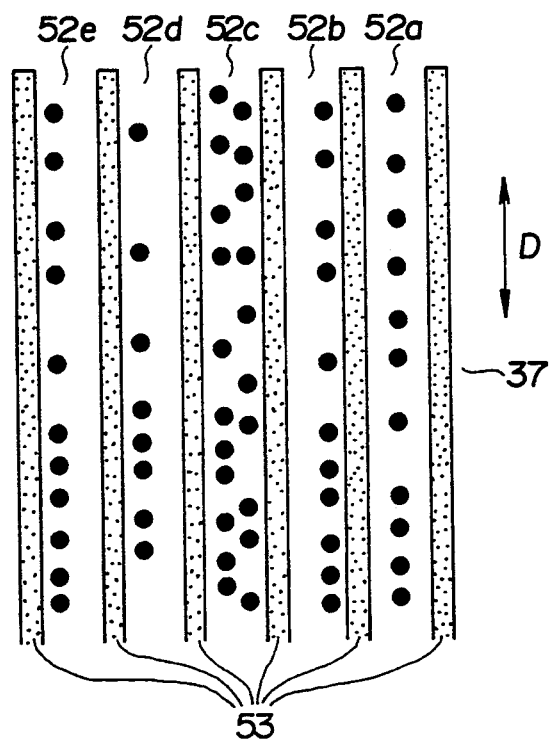
Figure 11:
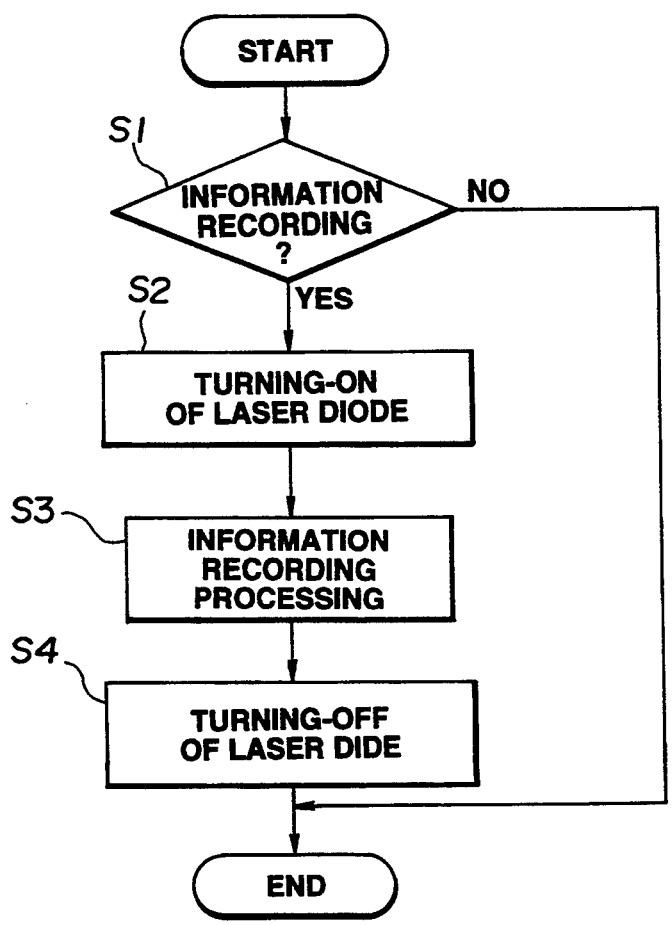

FIG. 12 shows an example of the pit train which is formed on the optical card 37 in a case where the data are recorded under the conditions illustrated respectively in FIGS. 8, 9 and 10.

An arrangement shown in FIG. 12 in which recording of the data is performed by a mode of the two-data train/the single information track arrangement includes an arrangement (52a, 52b and 52c) in which only one of the data trains is formed by the mode of the two-data train/the single rack arrangement and an arrangement (52c) in which only one of the data trains is fully formed by the two-data train. In a case where the two modes are recorded in mixture as shown in FIG. 12, the recording data (all) cannot be reproduced by the reproducing apparatus whose assumption is a recording medium of the existing single data train/the single information track arrangement, and the use of the apparatus according to the first embodiment becomes an assumption.

In fact, the arrangement may be such that, in a single optical card, recording is performed by the mode of the two-data train/the single information track arrangement in almost all of the track, for example. Meanwhile, even if the recording capacity is sacrificed, regarding information for enabling reading to be performed by the existing reproducing apparauts, recording is performed by an existence-in-mixture mode so as to form a pit train (data train) at a center of the track like the track 52a in FIG. 12 with respect to a partial track.

Moreover, since the optical card can be carried, recording is normally performed by the mode of the two-data trains/the single information track arrangement by the apparatus according to the first embodiment. In a case where the apparatus according to the first embodiment cannot be used at an objective location where the user of the optical card is moved, recording may be made by the existing apparatus in the mode of the single data train/the single information track arrangement.

Of course, an alternative using method as to whether recording is performed for every optical card by the mode of the two-data trains/the single information track arrangement and recording is performed by the mode of the existing mode, that is, by the mode of the single data train/the single information track arrangement (considered as being a normal or usual using method) may be used or adopted.

According to the first embodiment, the tracking light receiving elements are arranged in division in accordance with the shift amount of the data train which is formed on the track (in the track transverse direction), and this is selected in accordance with the forming position of the data train upon recording of the data, to perform the tracking control. Thus, since it is possible to form a plurality of data trains on the single information track, it is possible to largely increase the memory capacity.

Furthermore, as described previously, in the first embodiment, the optical head 71 is not provided with means for moving the light beam actively in the track transverse direction in the prior art , but the photo detector 100 is provided with three (3) light receiving elements which form the position detecting means for performing detection of the position of the beam spot in the track transverse direction. Two (2) of three (3) light receiving elements are selected. A control signal on the basis of outputs from them are applied to the track coil 94b to perform positioning of the beam spot.

That is, since the tracking control mechanism is utilized to perform positioning of the beam spot in the track transverse direction, it is made possible to substantially increase the number of light receiving elements more than the prior art, and the provision of the selecting switch for selecting the pairs of light receiving elements which are used for positioning makes possible positioning in the prior art. For this reason, the arrangement of the optical head 71 becomes almost the same as a normal optical head which has no means for moving the light beam actively in the track transverse direction except the photo detector 100. The arrangement can be simplified, weight can be reduced, and the cost cannot increase. Further, high-speed access is also made possible.

Moreover, it is made difficult to maintain or retain the positioned condition in the prior art. Whereas, in the present embodiment, since control is made by the feedback circuit, it is made easy or facilitated to retain the positioned condition.

Furthermore, the pit detecting light receiving element is so arranged as to uniquely correspond to the formed data trains, and the plurality of data trains are reproduced in a lump upon reproduction of the data, whereby speedup of the reproducing treatment or processing speed can be realized.

Further, since interchangeability is considered so as to be capable of recording and reproducing by the mode of the existing single data train/the single information track arrangement, the existing optical card can also be used, and recording of the data can also be performed so as to be used by the existing recording/reproducing apparatus.

Moreover, since realization can be made by the arrangement which is less in changing point from the recording/reproducing apparatus of the existing single data train/the single information track arrangement, there can be provided an optical-card recording/reproducing apparatus which is extremely high in cost performance.

In connection with the above, in the first embodiment, in a case of being recorded or reproduced by a plurality of data trains/a single information track, positional control in which positioning is made to a plurality of positions including the central position of the track may be performed.

Furthermore, in a single optical card, in a case of being recorded by the plurality of data trains/the single information track and a case of being recorded by the mode of the single data train/the single information track arrangement are assumed, the recording region of the directory information may also cope with a case of being recorded by the plurality of modes.

For example, the recording region which writes the directory information of the information track performing recording by the mode of the single data train/the single information track arrangement performs recording by the mode of the single data train/the single information track arrangement, to enable recording or reproducing to be performed by the normal or usual (existing) recording/reproducing apparatus. In this case, the recording region for the directory information on the information track which performs recording by, for example, the mode of the single data train/the single information track arrangement is set to an initial or starting region section of the recording region for all the directory information. In a case of performing access by the mode of the single data train/the single information track arrangement, it may be possible to perform reading without the generation or occurrence of a reading error.

Figure 13:
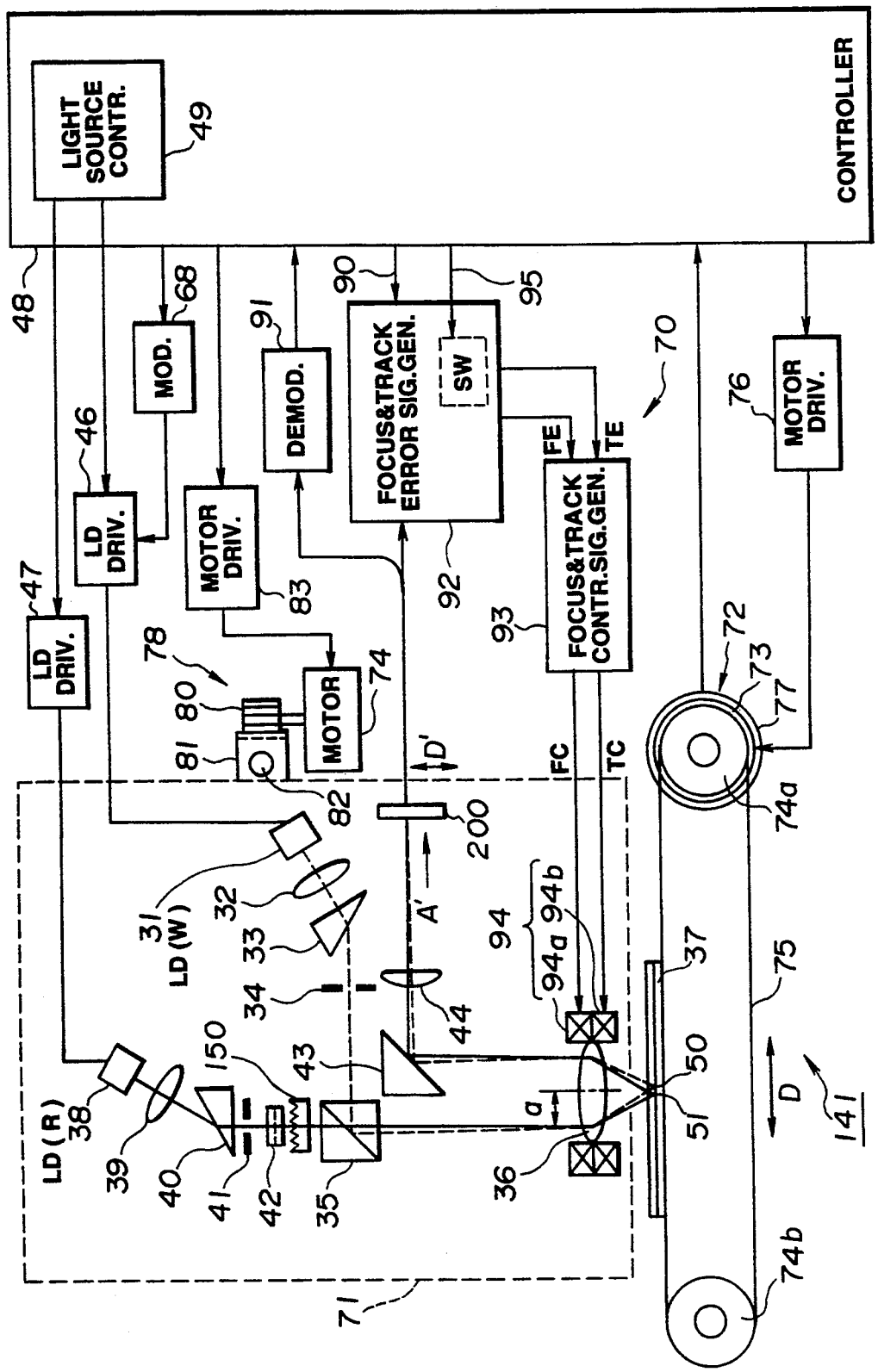
FIGS. 13 to 15 relate to a second embodiment of the invention, FIG. 13 being a view showing an arrangement of an optical system and a light-source driving system of an optical-card recording/reproducing apparatus.

FIG. 13 shows an arrangement of an optical-card recording/reproducing apparatus 141 according to a second embodiment of the invention. In the second embodiment, a diffraction grating 150 is provided on the side of a reading beam in an optical head 71 to perform reading by a 0-order light and a primary-order light. Further, a tracking light receiving element is provided for a verify beam. The tracking light receiving element is arranged in shift in position correspondingly to a shift of a data train. Upon writing, switching is made to the tracking light receiving element for verify to apply tracking. The reading light receiving element is arranged in division correspondingly to the data trains which are formed on the single track.

In FIG. 13, the arrangement and connection of the apparatus are substantially similar to those of the first embodiment illustrated in FIG. 6, and the description of overlapped portions will be omitted. In this connection, elements to which the same reference numerals are applied indicate elements which have respective functions thereof the same as those of the elements in the first embodiment. In the apparatus of the present embodiment is arranged such that the diffraction grating 150 is incorporated in a reproducing light-source system. An arrangement of a photo detector 200 used is different from that in the first embodiment.

Only one direction of a reproducing light beam within a plane vertical to an optical axis is subject to a diffracting action by a plain concave cylindrical lens 42, and the reproducing beam is brought to a beam which slightly diverges in the direction. Further, the reproducing light is divided by the diffraction grating 150 into three (3) beams including a 0-order diffracted light and two (2) primary-order diffracted lights. At this time, the divergent direction of the beam due to the cylindrical lens 42 and the diffracted direction due to the diffracting grating 150 are substantially perpendicular to each other.

The three (3) beams consist substantially of a P-polarized component due to the property of the semiconductor laser. The three (3) beams are substantially transparentized or are transmitted through a polarizing beam splitter 35 so as to be incident upon a position which is eccentric from the optical axis with respect to an objective lens 36. These three (3) beams are condensed onto an optical card 37 by the objective lens 36 so that the 0-order diffracted light and the primary diffracted light are brought to three (3) spots, respectively, which have respective configurations thereof enlarged in a divergence direction by the cylindrical lens 42.

Figure 14:
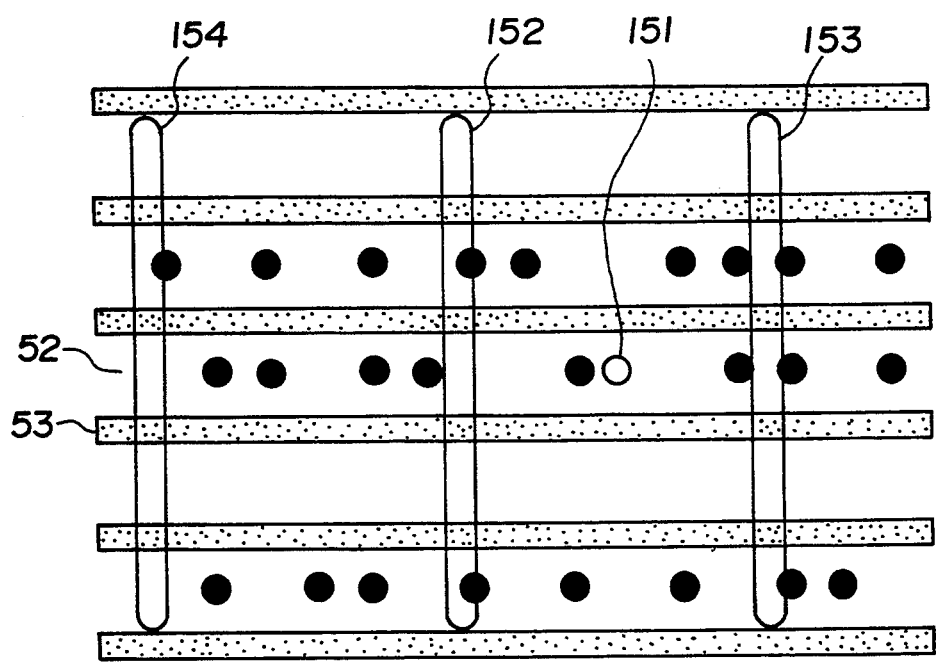

FIG. 14 shows a recording light beam spot 151 on the optical card 37 and spots 152, 153 and 154 due to the diffracted light of the reproducing light beam. The relationship in relative position of these spots gives an angular difference relatively to a location between an optical axis of the recording light beam and an optical axis of the reproducing light beam prior to incidence upon the objective lens 36 upon assembling and regulation of the optical head, to perform regulation such that the recording light beam spot 151 is located between the spot 152 due to the 0-order diffracted light of the reproducing light beam and one of the two (2) spots 153 and 154 due to the primary diffracted light.

Moreover, a direction having a diffracting action of the cylindrical lens 42 is brought to one in which an enlarged direction of the reproducing beam spots 152, 153 and 154 is brought to a direction substantially perpendicular to a guide track 53 of the optical card, to simultaneously obtain information of a plurality of information tracks 52 of the optical card, as shown in FIG. 14.

Figure 15:
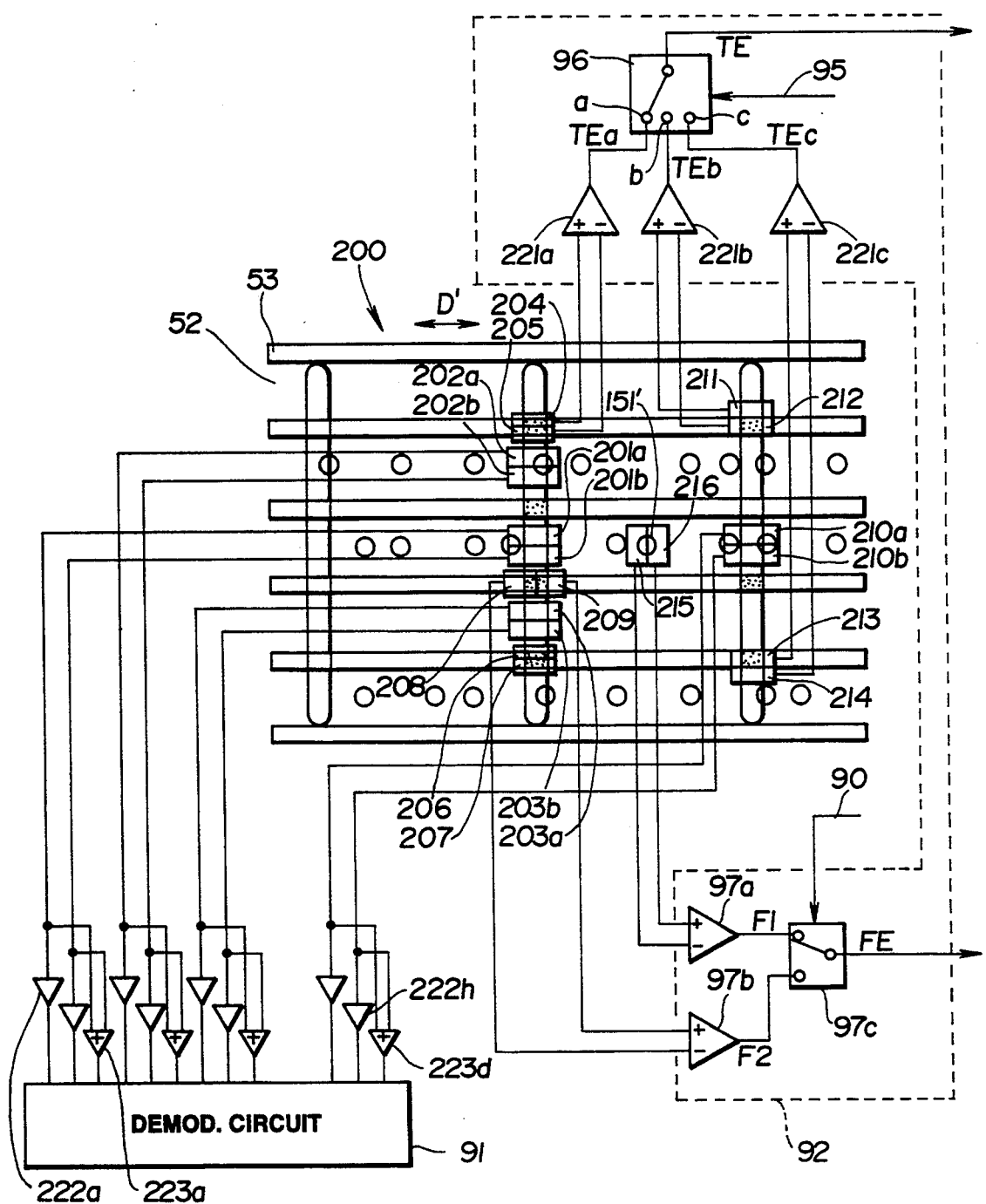

FIG. 15 shows spot images of the 0-order diffracted light and the primary-order diffracted light of the reproducing light beam which is projected onto the photo detector 200, a spot image of the recording light beam, and a portion of the signal processing system.

Pit detecting light receiving elements 201a, 201b, 202a, 202b, 203a and 203b, tracking light receiving elements 204, 205, 206 and 207 and reproducing focusing light receiving elements 208 and 209 are arranged on the photo detector 200 at imaging positions of the reproducing beam spot 152.

Furthermore, the tracking light receiving elements 211 and 212, and 213 and 214 are arranged respectively at positions which are shifted from each other in directions opposite to each other in the track transverse direction by a shift amount of the data train with respect to a center of the information track, with respect to pit detecting light receiving elements 210a and 210b and the tracking light receiving elements 204 and 205 at the imaging position of the reproducing beam spot 153. The spot image of the reproducing light is imaged at a proper or adequate position on these light receiving elements under a condition that there is no track shift and no focus shift.

The pairs of tracking light receiving elements 204 and 205; 211 and 212; and 213 and 214 detect changes in position of the images of the track guides due to the respective track shifts, as a change in light receiving amount, to generate the tracking error signal.

That is, outputs from the respective light receiving elements 204 and 205; 211 and 212; and 213 and 214 are inputted to differential amplifiers 221a, 221b and 221c, to generate error signals TEa, TEb and TEc from a center line position of the information track, a line position approaching downwardly from the center line and a line position approaching upwardly from the center line, on the basis of the recording light spot.

Accordingly, positioning control of the objective lens 36 in the track transverse direction through a tracking coil 94b is performed by the track control signal which is generated by the signal TE selected by a switch 96, whereby it is possible to set the recording light spots to the positions, respectively.

The reproducing focusing light receiving elements 208 and 209 detect focus shift upon reproducing. Moreover, presence and absence of the pits on the information track are detected by the pit detecting light receiving elements 201a, 201b, 202a, 202b, 203a, 203b, 210a and 210b upon reproducing, on the basis of a change in light quantity, to output a pit detecting signal. For this reason, the outputs from the respective light receiving elements 201a, 201b, 202a, 202b, 203a, 203b, 210a and 210b are inputted to buffer amplifiers 222a~222h (only the reference numerals 222a and 222h are shown in FIG. 15). Furthermore, outputs from the respective pairs of light receiving elements 201a and 201b; 202a and 202b; 203a and 203b; and 210a and 210b are added to each other by adding amplifiers 223a and 223d (only the reference numerals 223a and 223d are shown in FIG. 15).

Further, a pair of recording focusing light receiving elements 215 and 216 are arranged on the photo detector 200. An image 151' of the spot 151 of the recording light is imaged to an adequate position on these light receiving elements under a condition that there is no track shift and no focus shift. The focusing light receiving elements 215 and 216 for the recording light detect the shift in position of the recording light beam by a differential amplifier 97a, to generate a focus error signal F1 of the recording light.

The tracking control upon the time the pit is shifted from the center of the information track and is recorded will hereunder be described.

In a case where the data train is shifted downwardly from the center of the information track in the two-data train/the single track arrangement, the tracking light receiving elements 211 and 212 are selected upon recording of the data to perform the tracking control, to thereby form a pit to a location approaching downwardly of the information track (that is, in a case where the tracking light receiving elements 211 and 212 for recording are selected, the side of a light image (that is, the side of the optical card) is shifted relatively upwardly in FIG. 15 (with respect to the side of the light receiving elements 211 and 212), and the position of the recording light beam spot 151 is located at a position approaching a position lower than the track).

In a case where verify processing is performed in parallel to the recording of the data upon recording of the data, detection is made by the pit detecting light receiving element 201a or 210a in accordance with a moving direction of the optical card 37, to generate a pit detecting signal.

In a case where the data train is shifted upwardly from the center of the information track in the two-data train/the single information track arrangement, the tracking light receiving elements 213 and 214 for recording are selected upon recording of the data to perform the tracking control, to thereby form a pit at a location approaching downwardly of the information track. In a case where verify processing is performed in parallel with recording of the data upon recording of the data, detection is made by the pit detecting light receiving element 201b or 210b in accordance with the moving direction of the optical card 37, to generate the pit detecting signal.

In a case of the existing mode of the single data train/the single information track arrangement, the tracking light receiving elements 204 and 205 or 206 and 207 for reproduction are selected to perform the tracking control upon recording of the data, to thereby form the pit at the center of the information track. In a case where the verify processing is performed in parallel with recording of the data upon recording of the data, detection is made by sum signals from the pit detecting light receiving elements 201a and 201b or sum signals from the pit detecting light receiving elements 210a and 210b in accordance with the moving direction of the optical card 37, to generate the pit detecting signal.

The tracking light receiving elements 204 and 205 or 206 and 207 are selected upon reproduction of the data to perform the tracking control. The plurality of data trains are led in lump by the plurality of pit detecting light receiving elements which are arranged uniquely in correspondence to each of the data trains.

In a case of aiming at the pit detecting light receiving elements 202a and 202b, the data train in which the pit train is shifted downwardly is detected by the pit detecting light receiving element 202b to generate the pit detecting signal.

The data train in which the pit train is shifted upwardly is detected by the pit detecting light receiving element 202a, to generate the pit detecting signal. Moreover, the data train in which the pit train is located at a center is detected by a sum signal of the pit detecting light receiving elements 202a and 202b, to generate the pit detecting signal.

Also in the present embodiment, it is possible to form the pit train similar to that illustrated in FIG. 12 of the first embodiment, on the optical card 37.

The diffracted grating is incorporated in the reproducing light source system, the primary-order diffracted light of the reproducing light beam is utilized so as to be brought to a verify light beam, and verify processing is performed in parallel therewith upon recording of the data, whereby it is possible to perform processing at higher speed.

Figure 16:
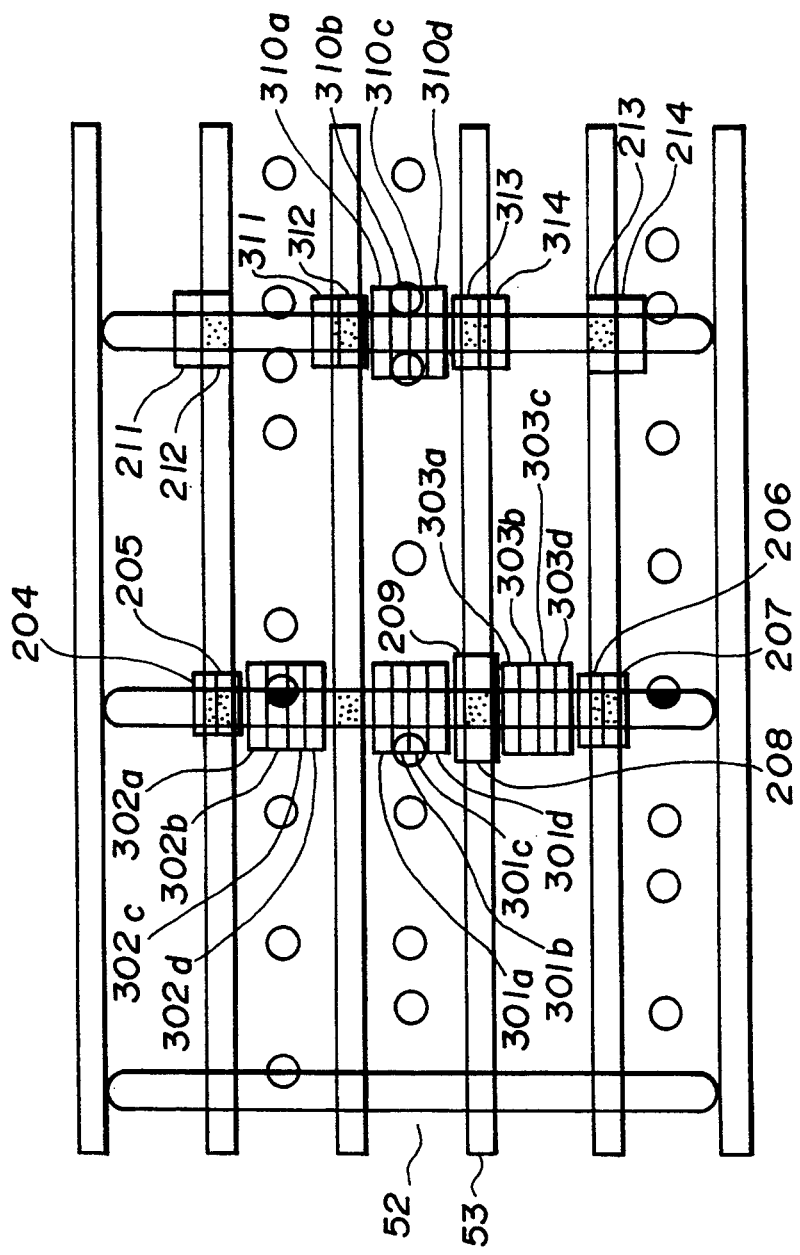
FIG. 16 is an explanatory view showing an image of a light beam spot on a recording surface of an optical card which is formed on a light receiving surface of a photo detector in a case of a multiple data train/a single information track arrangement, including the positional relationship of the track, in a third embodiment of the invention.

Furthermore, as shown in FIG. 16, a plurality of tracking light receiving elements 311, 312, 313 and 314 for the recording light are arranged in correspondence to the amount of shift of the data train, to a plurality of guide track imaging positions, so as to be selected from the light receiving elements 211, 212, 213, 214, 311, 312, 313 and 314 in accordance with the data train, to thereby perform the tracking control. The pit detecting light receiving elements 301a, 301b, 301c, 301d, 302a, 302b, 302c, 302d, 303a, 303b, 303c and 303d are divided in correspondence to the data trains, whereby it is possible to further increase the memory capacity.

According to the present embodiment described previously, since three or more tracking detector elements are arranged such that a plurality of data trains including the center position can be formed on the single information track, and two of the tracking detector elements are selected to perform control in position, it is possible to set the information to the recording or reproducing mode by the single data train/the single information track arrangement, and it is possible to set the information to the recording or reproducing mode by the plurality of data trains/the single information track arrangement. Since positioning is made by the tracking control in this manner, it is possible to perform retention to the positioned position with high accuracy.

In the aforesaid embodiment, a case of the optical card 37 having the information track in which the guide track is formed on both sides has been described.

Figure 4:
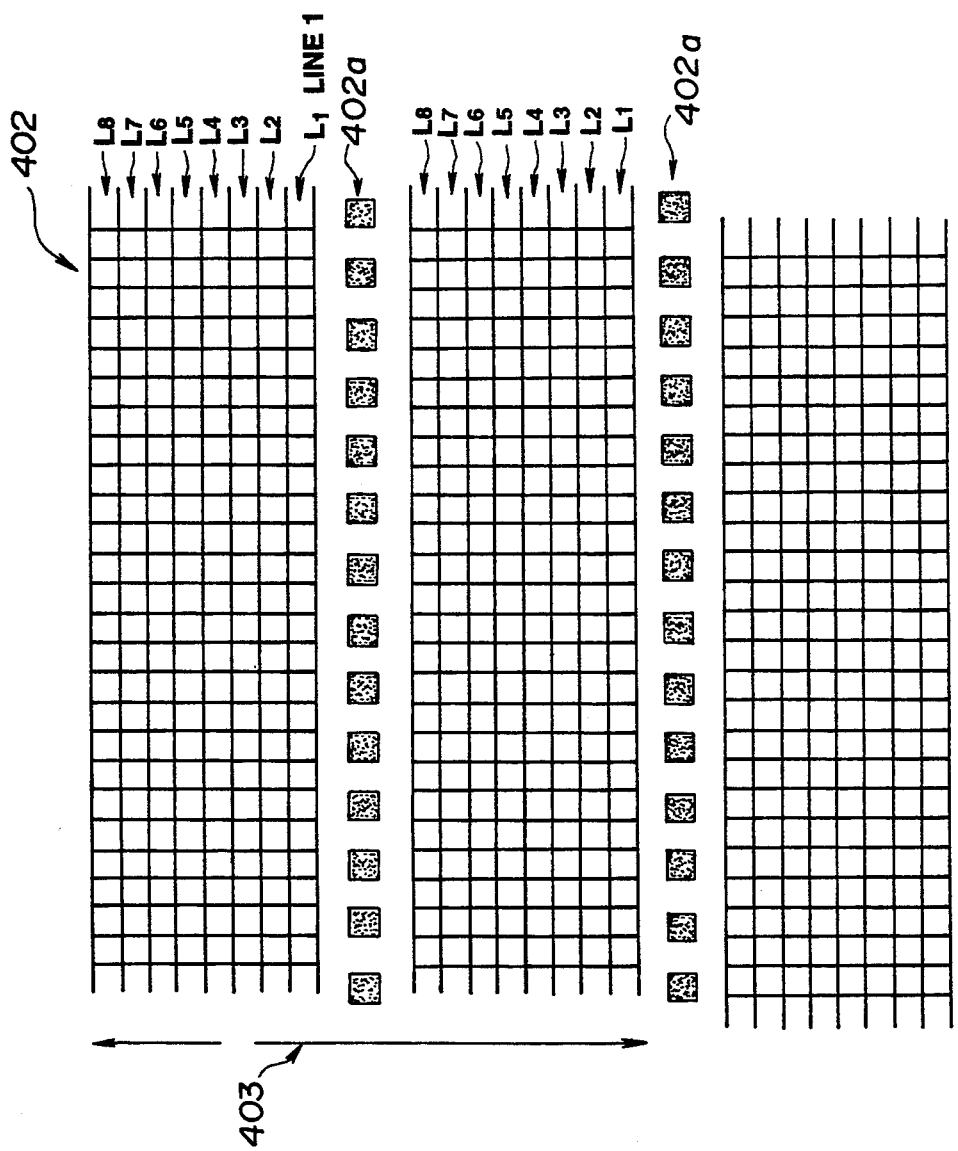
FIG. 4 is an explanatory view showing an arrangement of a track on an optical card in an another prior art.
Figure 5:
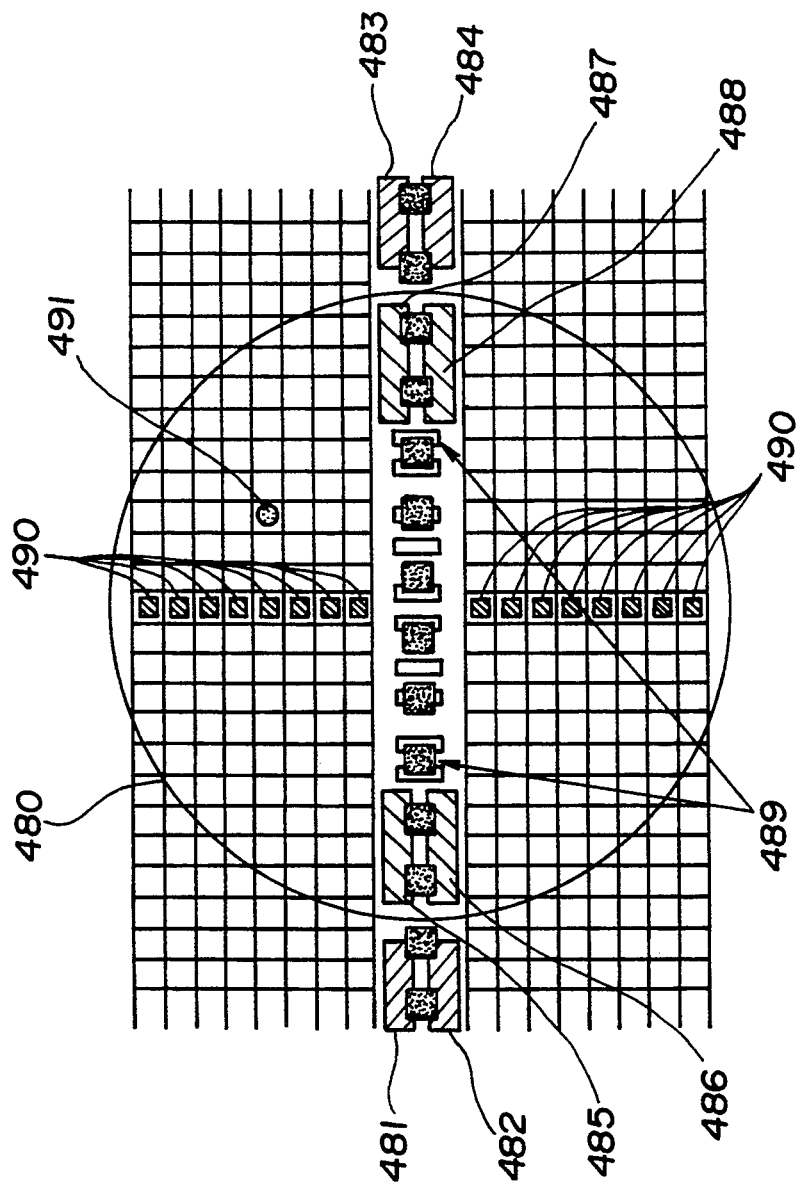
FIG. 5 is an explanatory view describing the relationship between cells and guide patterns of a detector illustrated in FIG. 4.

Next, as shown in FIG. 4, an embodiment which can position the recording light spot onto the optional recording line by selection of the positioning light receiving element with respect to the optical card 402 of the track 403 in which the plurality of recording lines are provided on both sides of the central guide pattern 402a will be described.

A fourth embodiment of the invention will hereunder be described with reference to FIGS. 17 to 25.

Figure 17:
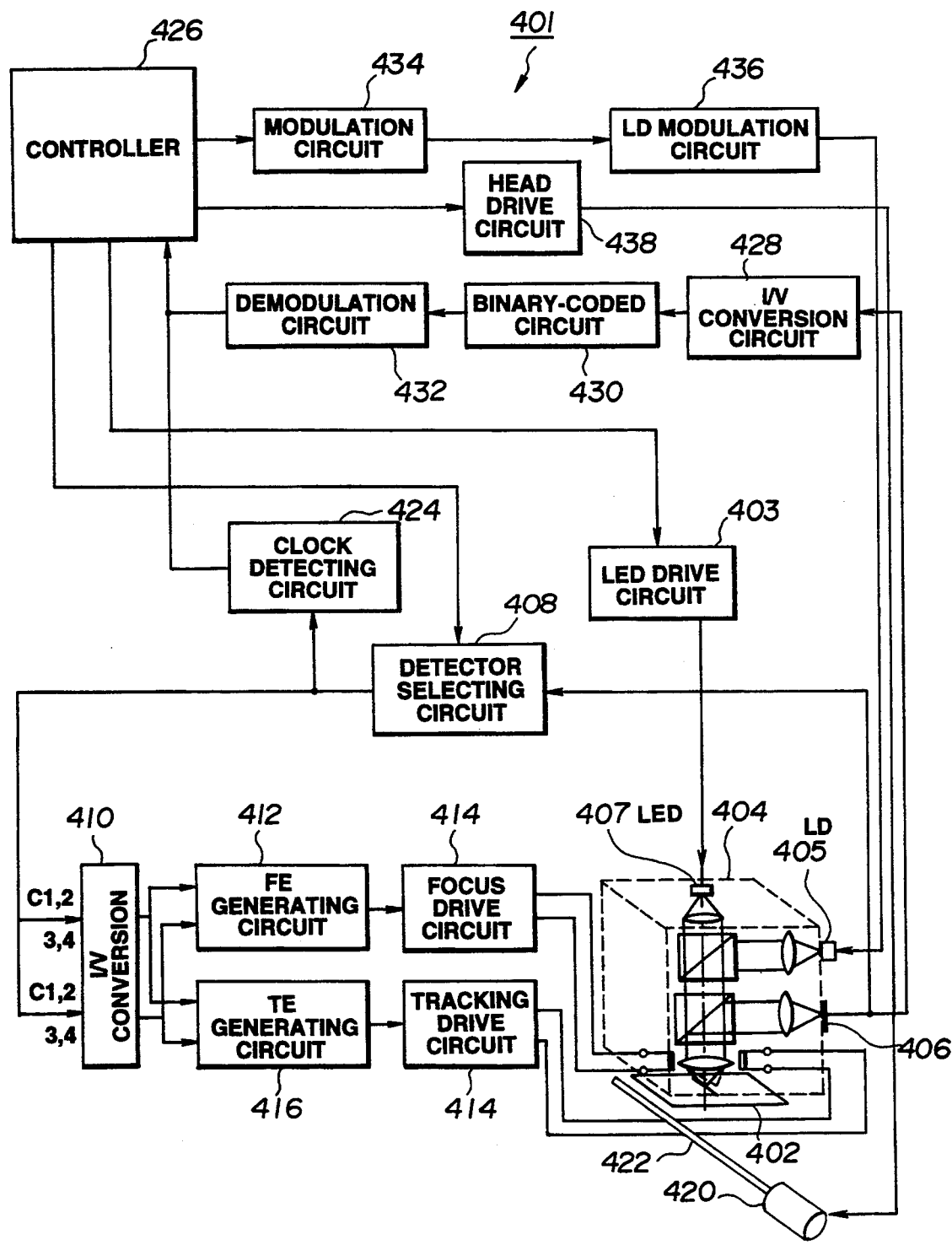
FIGS. 17 to 25 relate to a fourth embodiment of the invention, FIG. 17 being an arrangement view showing an arrangement of an optical-card recording/reproducing apparatus.

As shown in FIG. 17, an optical-card recoding and reproducing apparatus 401 according to the fourth embodiment of the invention irradiates an light beam to an optical card 402 by an optical head 404 which is provided with a semiconductor laser 405, a photo detector 406 and an LED 407, to perform recording and reproducing of data.

An arrangement of a recording surface of the optical card 402 is the same as that described with reference to FIG. 1, and the description thereof will be omitted.

An arrangement of the optical head 404 will be described by the use of FIG. 18. In the optical head 404, a reading beam for performing illumination in a wide area manner which is outputted from the LED 407 is collimated by a reading collimator lens 440, subsequently, is transparentized through beam splitters 441 and 442, and is condensed and irradiated upon the optical card 402 by an objective lens 443, to form a reading beam spot (referred also to simply as "reading spot") for performing illumination in a wide area manner.

At this time, a focusing coil 446 drives the objective lens 443 in a vertical direction (in a direction of an optical axis of the objective lens 443) so that the reading spot formed on the optical card 402 is irradiated in a wide area manner and adequately (so as to cover a single track width).

Reflecting light from the optical card 402 passes through the objective lens 443 and an imaging lens 445 by the beam splitter 442, is imaged onto the photo detector 406 and is detected. Further, a tracking coil 447 drives the objective lens 443 in a track transverse direction perpendicular to a track direction in which the track extends, such that the reading beam is positioned on the track of the optical card.

Meanwhile, upon writing of the data, a light beam outputted from a semiconductor laser 405 is collimated by a writing collimator lens 444, is transparentized through the beam splitters 441 and 442, and is condensed and irradiated upon the optical card 402 by the objective lens 443.

In FIG. 17, returning light from the optical card 402 is led to the photo detector 406 through the above-described optical system within the optical head 404. The photo detector 406 is provided with a plurality of positioning cells to be described subsequently, in order to position the light beam from the semiconductor laser 405 to a desired line of the optical card 402. The photo detector 406 selects four (4) pairs of cells from the plurality of positioning cells by a detector selecting circuit 408, to perform tracking control and focus control by a guide pattern of the optical card 402.

That is, current outputs from the four (4) pairs of cells which are selected by the detector selecting circuit 408 are converted to a voltage output by an I/V converter 410, to input the voltage output to a focus-error-signal (FE) generating circuit 412 and a tracking-error-signal (TE) generating circuit 416. A focus drive circuit 414 and a tracking drive circuit 418 drive the focusing coil 446 and the tracking coil 447 by the focus error signal generated by the FE generating circuit 412 and the tracking error signal generated by the TE generating circuit 416, to perform the tracking control and the focus control.

Upon data reading, the LED 407 is driven by an LED drive circuit 403 so that a reading beam is irradiated to the optical card 402. Reflecting light from the optical card 402 is led to the photo detector 406. A current output from the reading cell, to be described subsequently, of the photo detector 406 which detects the reflecting light from the optical card 402 is converted to a voltage output by an I/V converting circuit 428, and is converted to a binary-signal of "0" and "1" by a binary coded circuit 430.

Subsequently, data which are demodulated by a demodulation circuit 432 are inputted to a controller 426 in synchronism with a clock by detection of the clock which forms a guide pattern from the detector selecting circuit 408 by a clock detecting circuit 424. Data processing such as error correction or the like is performed. Thus, reading operation ends.

In connection with the above, upon driving of the head, the controller 426 gives a drive direction to a head drive circuit 438 to start driving of the optical head 404. The head drive circuit 438 operates a head drive motor 420 so that a reading screw 422 is rotated. Thus, the optical head 404 connected to the reading screw 422 is driven. In this connection, at this time, card drive control (not shown) is also performed.

Upon data writing, the controller performs coding for error correction to the data and starts by driving of the optical head 404 and the optical card 402. A writing start position is detected by reading of the data from the optical card 402 by means similar to that upon the above-described data reading and, subsequently, the data are outputted to a modulation circuit 434 in synchronism with the clock which is detected by the clock detecting circuit 424, to perform modulation processing.

The modulated data are outputted to an LD modulation circuit 436 which drives the semiconductor laser 405. By doing so, the semiconductor laser 405 within the optical head 404 is driven. The writing beam emits light, and data are recorded by formation of the pit on the optical card 402.

Figure 20:
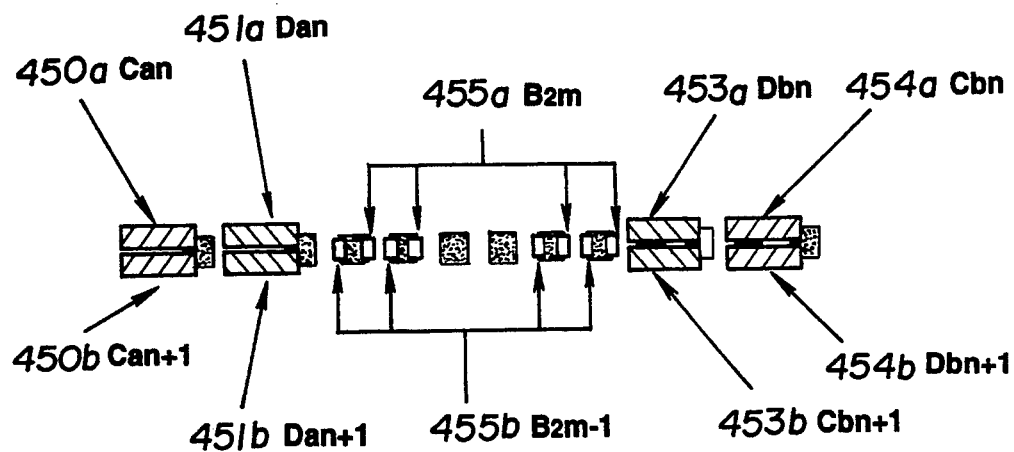

Here, FIGS. 19a, 19b and 20 are used to describe an arrangement of the photo detector 406.

As shown in FIG. 19a, the photo detector 406 comprises a Ca cell group 450 for detection of a servo signal each having nine (9) cells (the Ca cell group 450 is formed by cells Ca1~Ca9 toward a lower location from an upper location in the figure), a Da cell group 451 (similarly, the Da cell group 451 is formed by cells Da1~Da9), a Db cell group 453 (similarly, the Db cell group 453 is formed by cells Db1~Db9) and a Cb cell group 454 (similarly, the Cb cell group 454 is formed by cells Cb1~Cb9), and a reading cell group 452 having sixteen (16) cells for detection of data, and B cell groups 455 for detection of a clock having eight (8) sets each having eight (8) cells.

The reference numeral 456 denotes a reading beam, while the reference numeral 457 denotes a writing beam. FIG. 19a shows the relationship of relative position with respect to the above-mentioned cell groups.

That is, the optical detector 406 arranges eight (8) pairs of Ca cell groups 450 and Cb cell groups 454 for tracking servo control, and Da cell group 451 and Db cell group 453 for focus servo control as positioning cells of the writing beam 457 to the data lines 1(L1)~8(L8) (refer to FIG. 4), together with the B cell groups 455 as generation of clocks upon positioning to respective lines, in parallel with each other and in equal space.

For example, when positioning of the light beam 457 is performed on the data line 1(L1), outputs from the respective cells Ca1, Da1, Db1 and Cb1 are selected by the detector selecting circuit 408, and outputs from the respective cells of adjacent Ca2, Da2, Db2 and Cb2 are also selected.

The outputs from the respective cells of the selected Ca1, Da1, Db1 and Cb1 are used as outputs from the C1, D1, D3 and C3 cells of the prior art. Further, the outputs from the cells of the selected Ca2, Da2, Db2 and Cb2 are used as outputs from the C2, D2, D4 and C4 cells of the prior art. Moreover, corresponding eight (8) pairs of cells (eight (8) pairs of cells at the uppermost end in the drawing) are selected from the B cell groups as clock detection.

A case of selection due to the detector selecting circuit 408 in a case where the light beam 457 is positioned on the data line 1(L1) is specifically shown in FIG. 19b.

Similarly, when positioning of the light beam 457 is performed on the data line 2(L2), corresponding eight (8) pairs of cells (eight (8) pairs of cells at the second stage from the uppermost end in the drawing) are selected from the B cell groups as clock detection with the respective Ca2, Da2, Db2, Cb2, Ca3, Da3, Db3 and Cb3 corresponding to the outputs from C1~C4 and D1~D4.

Ca2, Da2, Db2 and Cb2 are shared in this manner both to the pairs of positioning cells of the data line 1(L1) and the data line 2(L2), whereby the arrangement of the optical disc 406 can further be simplified.

The light beam 457 is shifted in illuminating position together with a shift of the objective lens 443, so that positioning onto the objective line can be performed. That is, output signals from the positioning cells of the respective lines are selected. The output signals are used to perform the servo control. Thus, the objective lens 443 is shifted. The position of the positioning cell selected is agreement with the guide pattern.

Furthermore, the light beam 457 is previously regulated in position with respect to the objective lens 443 such that the light beam 457 is positioned on the data line 1(L1) when positioning is performed to the data line 1(L1), and is positioned on the data line 8(L8) when positioning is performed to the data line 8(L8).

The cell groups except the reading cell group 452 are selected by the detector selecting circuit 408. However, the selecting unit is illustrated in FIG. 20. FIG. 20 shows a condition in which Can (450a), Can+1 (450b), Cbn (454a), Cbn+1 (454b), Dan (451a), Dan+1 (451b), Dbn (453a) and Dbn+1 (453b) are selected as the servo detecting cells, and servo is normally applied to detect a clock by B2m (455a) and B2m-1 (455b) within the B cell groups.

Here, n=1~9.

Upon positioning of the light beam to the line 5 and upon tracking for reading, the controller 426 outputs a select signal of 3 bits for positioning the line 5 to the detector selecting circuit 408.

Figure 21:
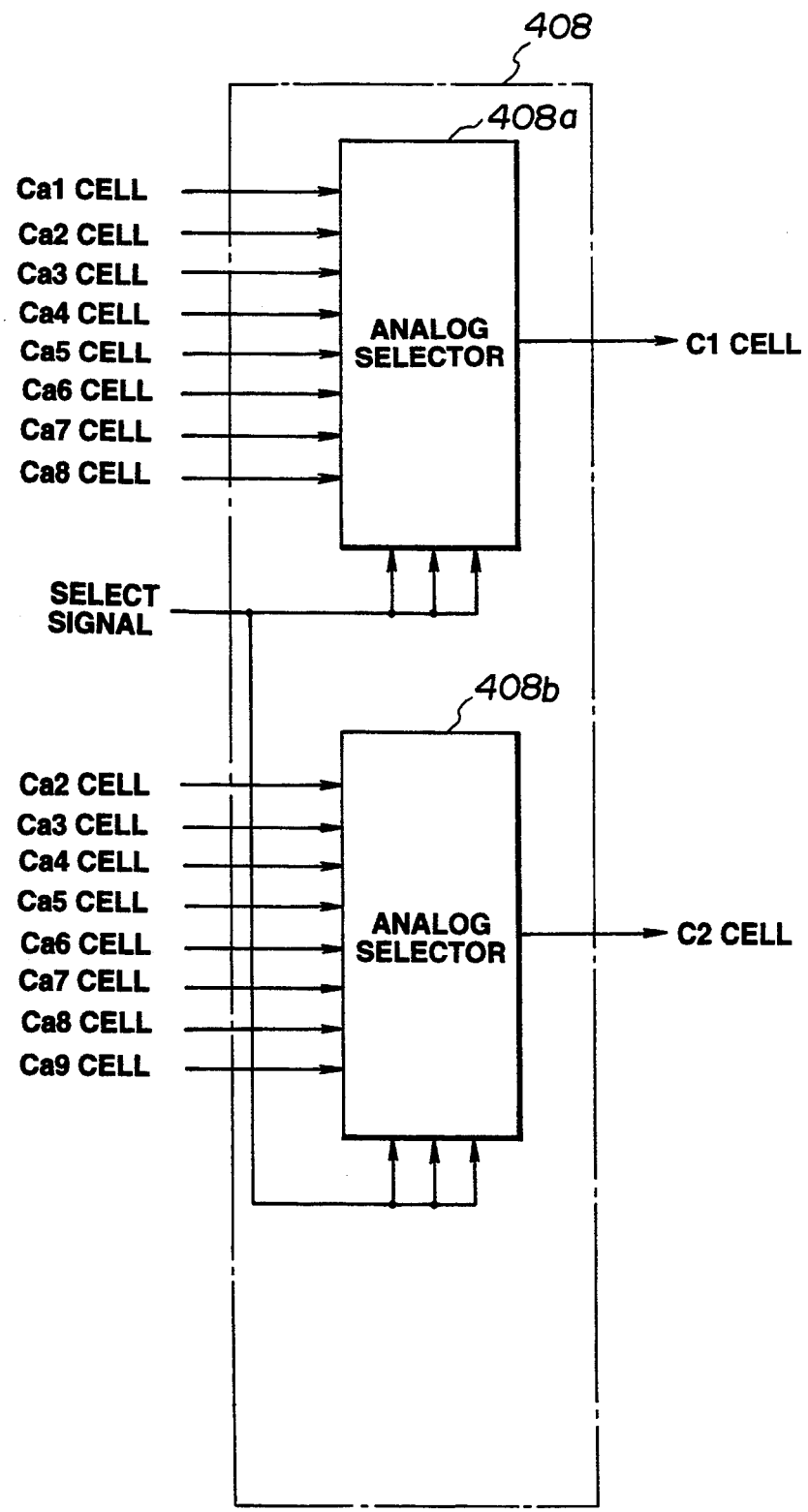

As shown in FIG. 21, the detector selecting circuit 408 inputs the select signal from the controller 426, to analog selectors 408a and 408b, whereby a cell for positioning the line 5 is selected from the Ca cell group 450 outputted from the photo detector 406 within the optical head 404, to output the cell to the I/V converting circuit 410 as C1 and C2.

In connection with the above, although not shown, the Da cell group 451, the Db cell group 453 and the Cb cell group 454 are also similarly selected and are outputted to the I/V converting circuit 410 as D1 and D2, D3 and D4, and C3 and C4. Further, the detector selecting circuit 408 may be so arranged as to be provided within the optical head 404 or within the photo detector 406, in order to reduce signal cables within the apparauts.

In this manner, for example, in a case where the data line 5(L5) is selected, the detector selecting circuit 408 selects and outputs the cell for positioning the line 5 from the outputs from the C cell groups 450 and 454 and the D cell groups 451 and 453 which are outputted from the photo detector 406 within the optical head 404. Signals from the C cell (Ca cell group 450 and Cb cell group 454) and the D cell (Da cell group 451 and Db cell group 453) outputted are converted by the I/V converting circuit 410, and are respectively inputted to the focus-error-signal generating circuit 412 and the tracking-error-signal generating circuit 416. The focus drive circuit 414 and the tracking drive circuit 418 drive the objective lens 443 within the optical head 404 so as to be located at a position optimum to the optical card 402 by the focus error signal and the tracking error signal.

Figure 23:
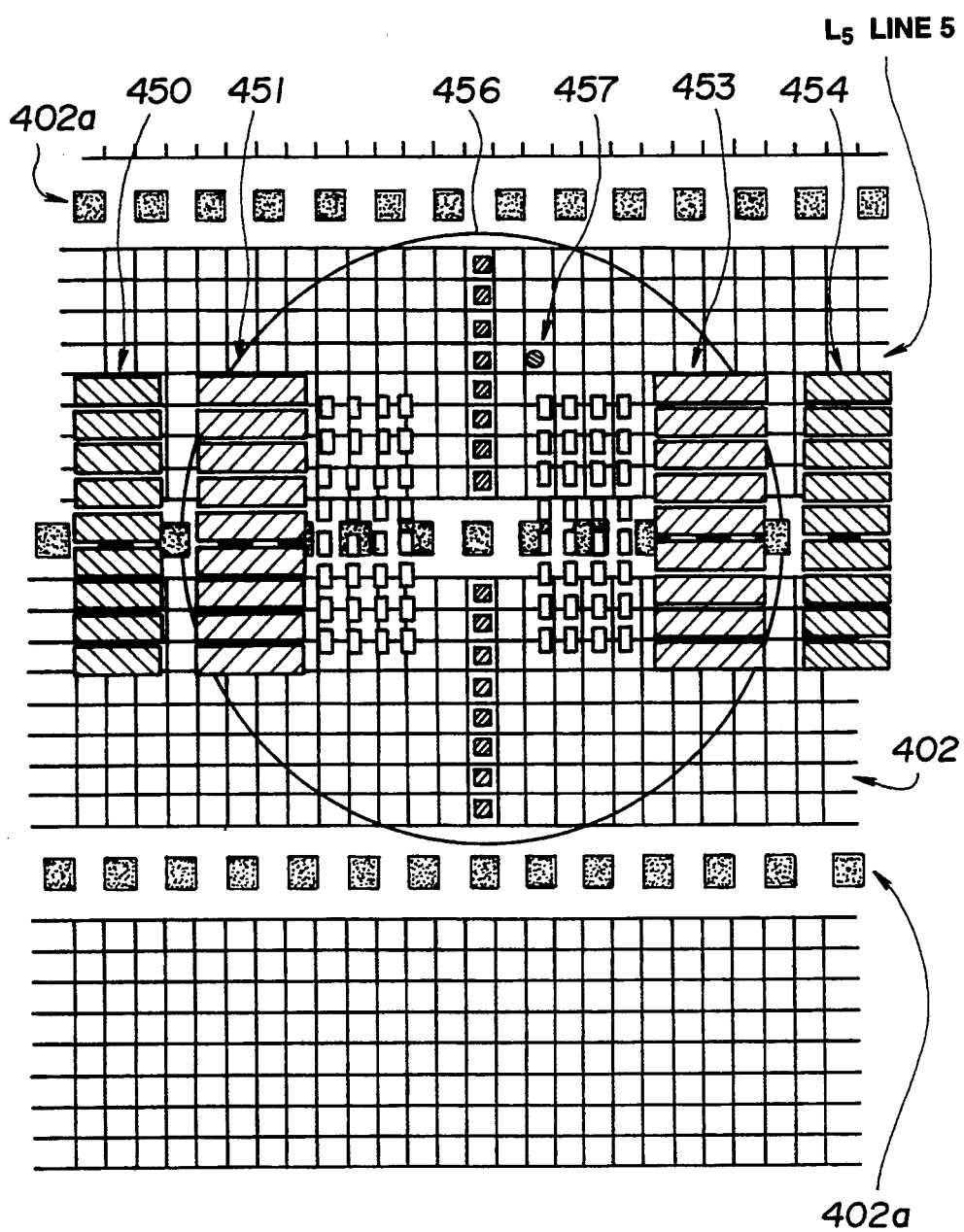

FIG. 23 shows the relationship between the photo detector and an image of the optical card 402 upon positioning of the data line 5(L5) of the reading beam 457 and upon reading. The objective lens 443 is driven whereby the light beam 457 is also positioned on the line 5. Moreover, at this time, the detector selecting circuit 408 selects and outputs the B cell at the fifth stage positioned on the data line 5(L5) from the output from the B cell group 455 which is outputted from the photo detector 406 within the optical head 404. Thus, even if where line positioning of the writing beam is performed, a clock is outputted.

Figure 24:
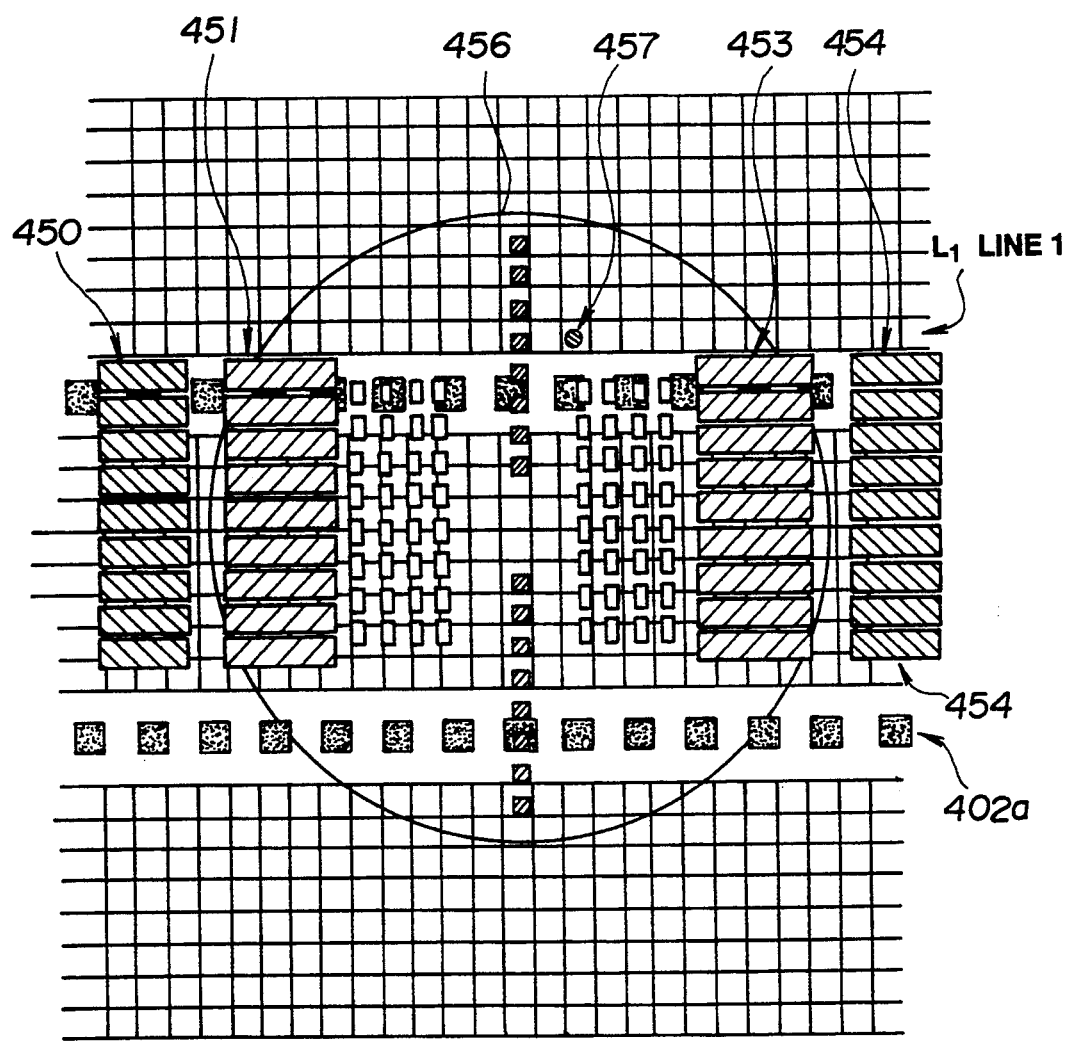
Figure 25:
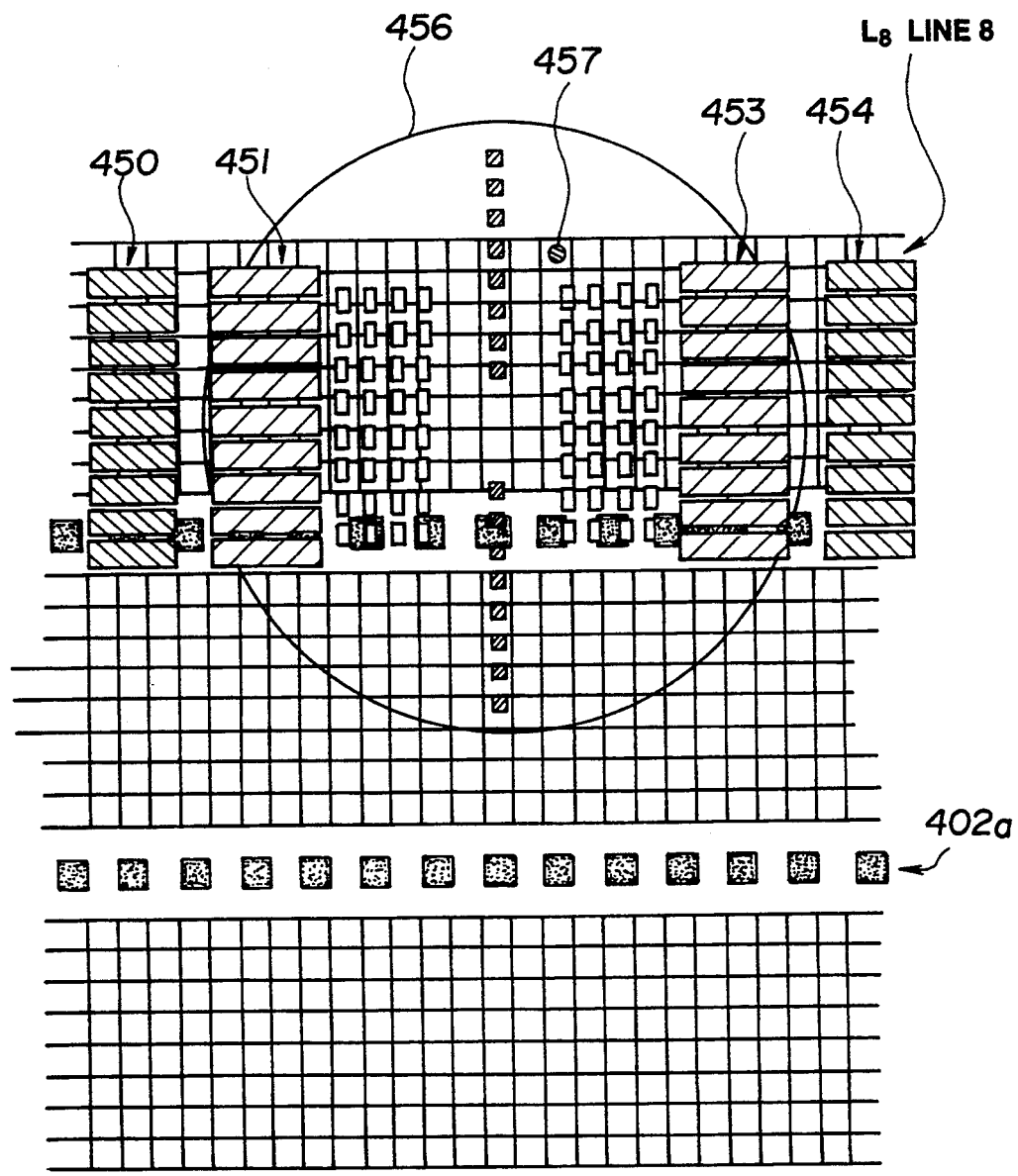

FIGS. 24 and 25 show a condition upon positioning of the writing beam 457 on data line 1(L1) upon positioning of the writing beam 457 on the data line 8(L8).

In FIG. 24, an output from the positioning cell for the data line 1(L1) within the photo detector 406, that is, Ca1, Ca2, Cb1, Cb2, Da1, Da2, Db1, Db2 and B cell at the uppermost stage are selected as a control signal. The light beam 457 is positioned on the data line 1(L1).

In order to position the optical head 404 to the objective track, the positioning cell of the data line 5(L5) is first selected by the detector selecting circuit 408, to move the optical head 404 in a track direction under a condition as it is that the focus servo is applied. Position is detected by the fact that the data pattern of 16 bits from the data cell group 452 upon zero cross detection of the tracking error signal produced at this time is in agreement with the objective track.

Subsequently, driving of the optical head 404 stops and, simultaneously, the track servo is applied to execute a method of performing positioning of the optical head 404.

As will be also clear from FIG. 23, in a case of positioning of the light beam 457 to the data line 5(L5), a driving direction is given to the head drive circuit 438, to start driving. The head drive circuit 438 operates the head drive motor 420, whereby the reading screw 22 is rotated, and the optical head 404 connected to the reading screw 422 is driven (refer to FIG. 17).

In this manner, it is possible to perform positioning of the optical head 404 onto the track. In a case of positioning to the other lines, tracking is made onto the objective track by the output from the positioning cell of the line 5 by the above-mentioned method, subsequently, the tracking servo is once turned off, and the positioning cell is switched to one for the objective line. Subsequently, the optical head 404 is driven in such a direction that the positioning cell is brought to the guide pattern. A position of the tracking error signal from the zero cross is detected whereby reading positioning is performed on the tracking servo.

Figure 22:
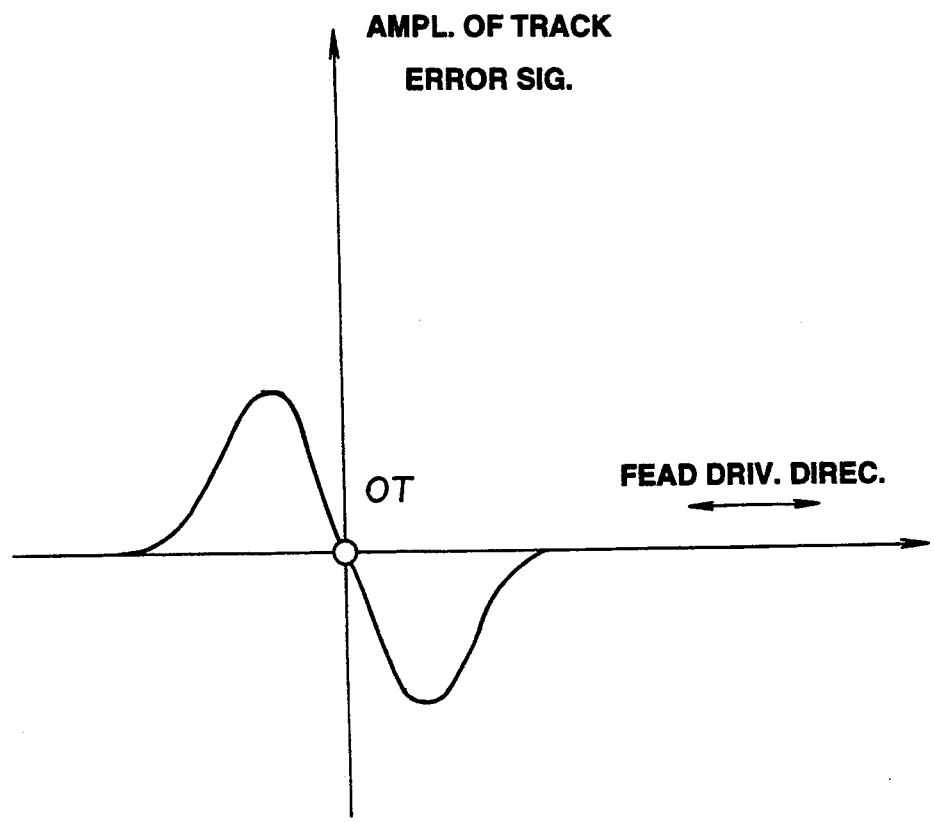

The tracking error signal at this time is shown in FIG. 22. When the optical head 404 is driven, the tracking error signal generated from the positioning cell is such that the zero cross indicated by an OT point is detected on the guide pattern. At this point, when the tracking servo is turned on, it is possible to reading the tracking error signal which is generated from the positioning cell, into the tracking servo. Thus, it is possible to position the light beam 457 to the objective line.

In FIG. 25, the positioning cell for the data line 8(L8) is selected similarly upon positioning of the line 1. The light beam 457 is positioned on the data line 8(L8).

In this manner, according to the optical-card recording and reproducing apparatus of the fourth embodiment, the plurality of positioning cells are provided on the detector, whereby it is possible to simply perform positioning to a desired data line, while the light beam is fixed. Thus, recording/reproducing of the information can be performed by a simple arrangement, and small-sizing and reduction in cost can be realized.

Figure 26:
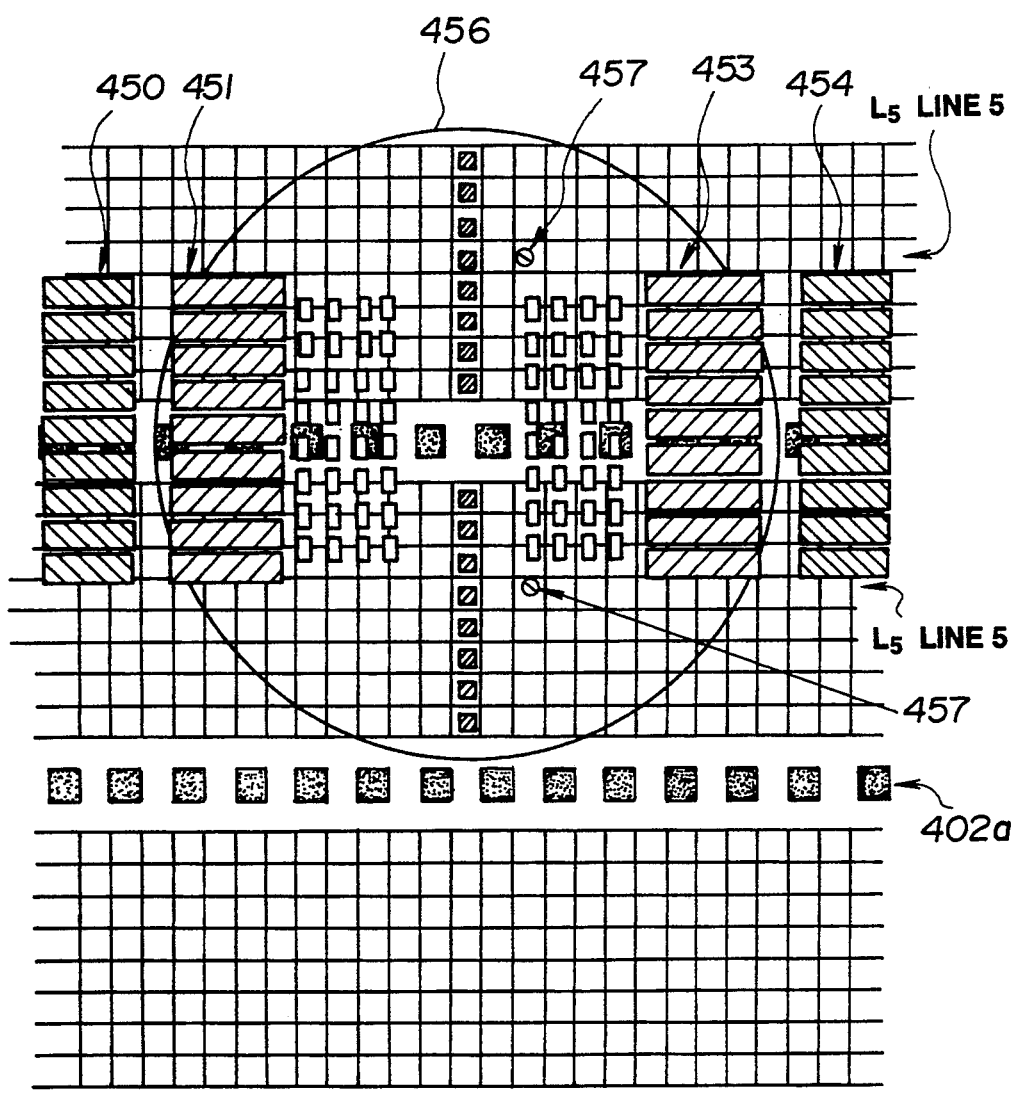
FIG. 26 is an explanatory view of positioning of a light beam onto a data line in a fifth embodiment of the invention.

Next, a fifth embodiment of the invention will be described. FIG. 26 is an explanatory view for describing positioning of a light beam to a data line, according to the fifth embodiment of the invention.

In recent years, development of a multi-channel LD has been performed as effective means for multi-channel recording/reproducing in an optical information recording and reproducing apparatus.

Figure 18:
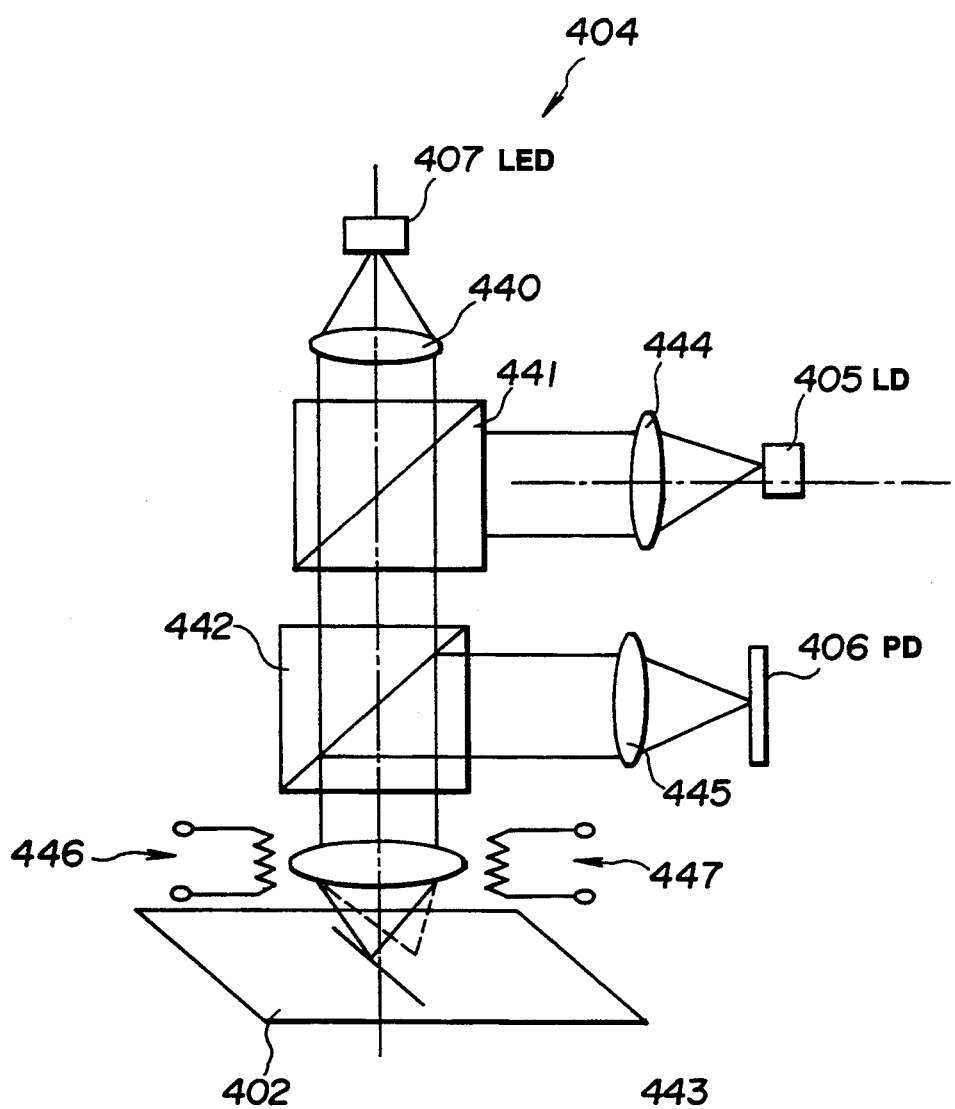
Figure 19:
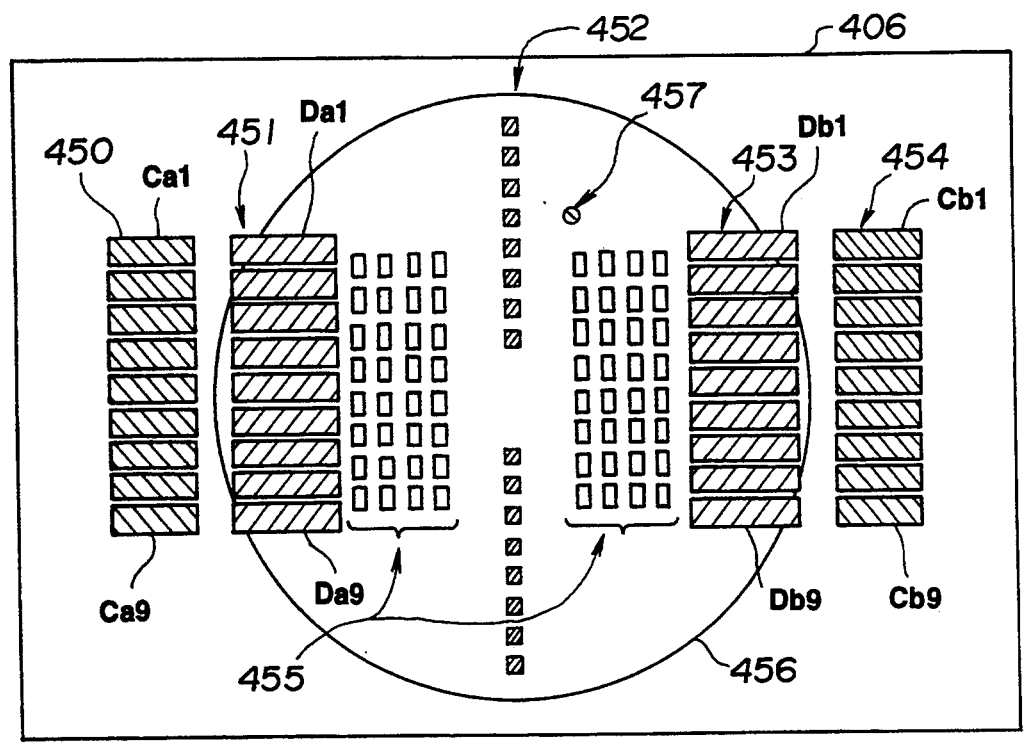
Figure 19:
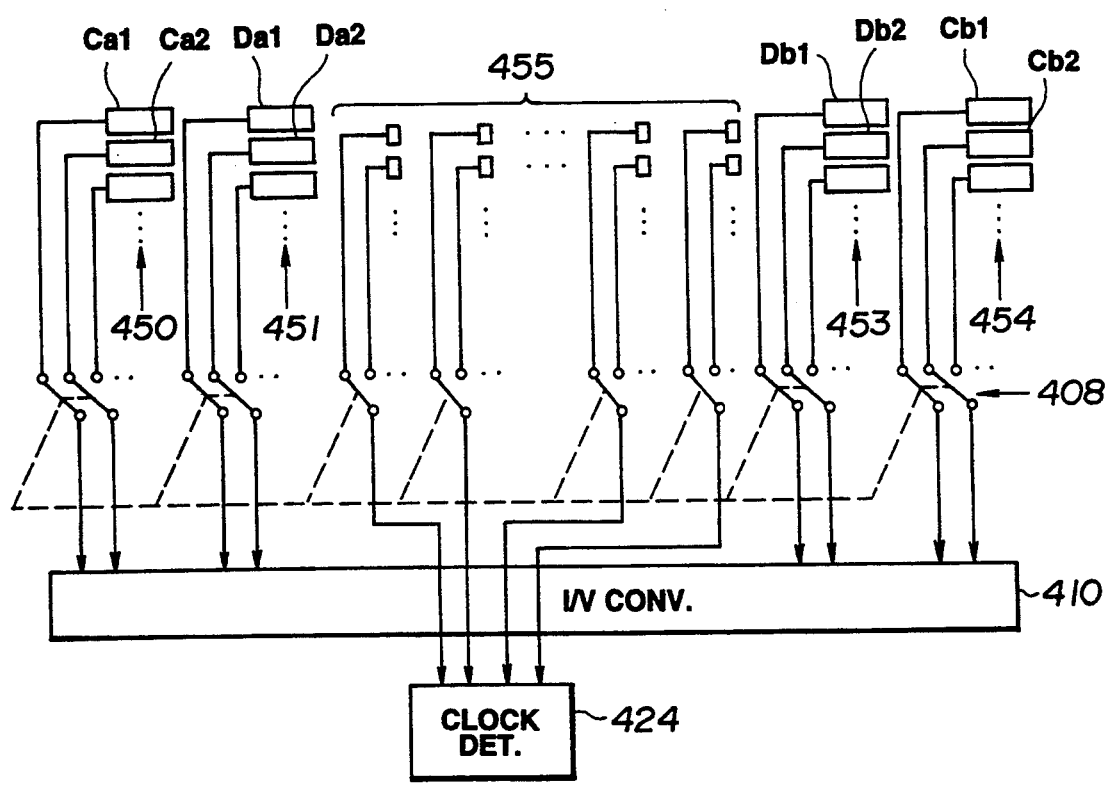

The fifth embodiment uses a two-channel LD, for example, to the semiconductor laser 405 in FIG. 18 which shows the optical head 404 in the fourth embodiment of the invention. The relationship between the photo detector 406 at that time and the optical card 402 is illustrated in FIG. 26. Two (2) light beams including a pair of light beams 457a and 457b are irradiated upon both sides of the guide pattern.

Accordingly, the fifth embodiment has the following advantages in addition to the advantages of the fourth embodiment. That is, as will be clear from FIG. 26, since there are a pair of light berms, the same lines on both sides of the guide pattern can simultaneously be written. Thus, it is possible to perform writing with high speed. Further, since positioning of the light beams 457a and 457b to each line is similar to the fourth embodiment, an arrangement and control are simplified similarly to the fourth embodiment.

Figure 27:
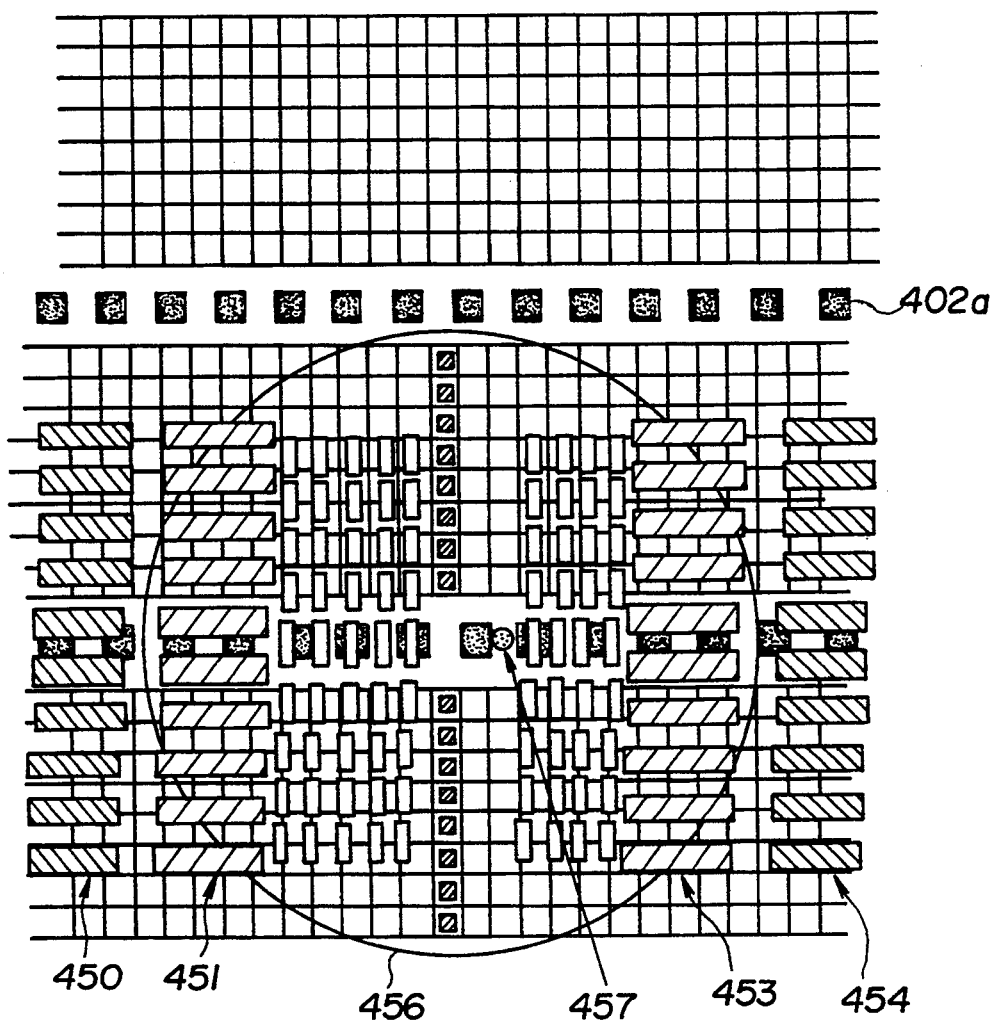
FIG. 27 is an explanatory view of positioning of a light beam onto a data line in a sixth embodiment of the invention.

Next, a sixth embodiment of the invention will be described. FIG. 27 is an explanatory view describing positioning of a light beam to a data line, according to the sixth embodiment of the invention.

As shown in FIG. 27, a light beam 457 is placed on a center of an objective lens, and positioning is performed every four (4) lines of each track with the guide pattern put therebetween, to perform recording. By doing so, aberration can be reduced because of a path which passes through a center of an optical axis of the objective lens less than a path of the light beam 457 shown in the fourth embodiment. Thus, it is possible to more raise accuracy of formation of a pit, in addition to the advantages of the fourth embodiment.

In connection with the above, the above-described embodiments can be combined partially or the like with each other to form different embodiments. These different embodiments belong to the present invention.

What is claimed is:

1. A beam-spot control unit comprising:
   a light source for generating a light beam;
   a beam irradiating optical system for irradiating said light beam to an optical recording medium having a plurality of tracks onto which information is recordable, to form at least one beam spot on said tracks;
   photo detecting means arranged in a corresponding direction corresponding to a track transverse direction transversing said tracks, and having photo detecting elements for receiving returning light from said at least one beam spot at a plurality of positions equal to or more than three different from each other;
   positioning-signal generating means for generating a positioning signal for performing positioning to a plurality of reference positions in said track transverse direction within each of said tracks, on the basis of an output from said photo detecting means; and position setting means for controlling said beam irradiating optical system by said positioning signal to set beam spot positions formed on said tracks through said beam irradiating optical system, to an optional position of said plurality of reference positions.

2. A beam-spot control unit according to claim 1, wherein said positioning-signal generating means has error-signal generating means for generating an error signal expressing a shift in position from said plurality of reference positions, from outputs from the respective photo detecting elements which receive reflecting light of said at least one beam spot.

3. A beam-spot control unit according to claim 2, wherein said position setting means generates a control signal from said error signal for setting said beam spot positions to an optional position of said plurality of reference positions.

4. A beam-spot control unit according to claim 2, wherein said position setting means controls said beam spot positions from said error signal such that said error signal is zeroed.

5. A beam-spot control unit according to claim 2, wherein said position setting means controls said beam irradiating optical system to a position in said track transverse direction, from said error signal such that said error signal is zeroed.

6. A beam-spot control unit according to claim 1, including reproducing means for optically reproducing information which is recorded on said track.

7. A beam-spot control unit according to claim 6, wherein said reproducing means has a second photo detecting element for receiving returning light from said at least one beam spot, said second photo detecting element being provided on said photo detecting means, and being arranged at a location different from said photo detecting elements.

8. A beam-spot control unit according to claim 7, wherein said second photo detecting element receives the reflecting light from said at least one beam spot at said reference position within said track to which said plurality of reference positions belong, in interlocking with the fact that said beam spot position is set to an optional position of said plurality of reference positions.

9. A beam-spot control unit according to claim 7, wherein said second photo detecting element receives the reflecting light from said at least one beam spot at said reference position within said track different from tracks to which said plurality of reference positions belong, in interlocking with the fact that said beam spot position is set to an optional position of said plurality of reference positions.

10. A beam-spot control unit according to any one of claims 8 and 9, wherein said second photo detecting element is formed by a plurality of photo detecting elements which receive lights from a plurality of respective reference positions.

11. A beam-spot control unit according to claim 1, including recording means for optically recording information onto said track.

12. A beam-spot control unit according to claim 11, wherein said recording means has a second light source which is different from the first-mentioned light source, and wherein a second light beam generated by said second light source is irradiated upon said tracks through said beam irradiating optical system to form a second beam spot.

13. A beam-spot control unit according to claim 12, wherein a position of said second beam spot formed on said tracks is controlled in interlocking with control of a position of said at least one beam spot which is formed on said tracks through said beam irradiating optical system.

14. A beam-spot control unit according to claim 13, including a light receiving element for receiving the reflecting light from positions on both sides of a position where said second beam spot is formed with reference to a track direction in which said track extends.

15. A beam-spot control unit according to claim 1, wherein said plurality of reference positions are positions in which said tracks are divided into at least three in said track transverse direction.

16. A beam-spot control unit according to claim 1, wherein said positioning-signal generating means has selecting means for selecting two photo detecting elements from said photo detecting elements.

17. A beam-spot control unit according to claim 16, wherein said position setting means is capable of positioning said at least one beam spot to each of said plurality of reference positions by selection due to said selecting means.

18. A beam-spot control unit according to claim 17, wherein said plurality of reference positions include a central line position which bisects said tracks in said track transverse direction.

19. A beam-spot control unit according to claim 1, wherein said position setting means has moving means for moving said beam irradiating optical system in said track transverse direction.

20. A beam-spot control unit according to claim 1, wherein said beam irradiating optical system forms said at least one beam spot extending in the form of a slit with length equal to or more than a single track width, in said track transverse direction.

21. A beam-spot control unit according to claim 1, wherein said optical recording medium is a rectangular optical card which is formed with said plurality of tracks in the form of a line in parallel relation to each other.

22. A beam-spot control unit according to claim 1, wherein said optical recording medium is a rectangular optical card which is formed with said plurality of tracks in the form of a line in .parallel relation to each other, each of said tracks being formed with a plurality of information recording regions in the form of a line on both sides of a central guide pattern.

23. A beam-spot control unit according to claim 22, wherein said positioning-signal generating means is such that said beam spot position is set in accordance with said photo detecting elements which receive the reflecting light at said guide pattern in said at least one beam spot.

24. A beam-spot control unit according to claim 22, including focus control means for receiving the reflecting light at said guide pattern in said at least one beam spot to perform focus control.

25. A beam-spot control unit according to claim 1, including carrier means for carrying said optical recording medium in a track direction in which said tracks extend.

26. A beam-spot control unit according to claim 1, wherein said beam irradiating optical system irradiates said light beam in said track transverse direction, to form said at least one beam spot in the form of a slit so as to span said plurality of tracks.

27. A beam-spot control unit according to claim 1, wherein said beam irradiating optical system irradiates said light beam in said track transverse direction and a track direction in which said track extends, to form said at least one beam spot in the form of a circle of the order of a single track width.

28. A beam-spot control unit according to claim 1, including optical information recording/reproducing means which is provided with recording means for optically recording information onto said tracks, and reproducing means for optically reproducing the information recorded on said tracks.

29. A beam-spot control unit according to claim 28, where in said optical information recording/reproducing means has verify function of reproducing information optically recorded on said tracks by said recording means, by said reproducing means after a minute time.

30. A beam-spot control unit comprising;
a light source for generating a light beam;
a beam irradiating optical system for irradiating said light beam to an optical recording medium having a plurality of tracks, to form at least one beam spot having substantially a single track width on said tracks in a track transverse direction;
photo detecting means arranged in a corresponding direction corresponding to the track transverse direction and having photo detecting elements which receive returning light from said at least one beam spot, at a plurality of positions equal to or more than three, which are different from each other;
positioning-signal generating means for generating a positioning signal for performing positioning to a plurality of reference positions in said track transverse direction within each of said tracks, on the basis of an output from said photo detecting means; and
position setting means for controlling a moving amount of said beam irradiating optical system in the track transverse direction by said positioning signal to set a position of said at least one beam spot to positions corresponding respectively to said plurality of reference positions.

31. A beam-spot control unit comprising:
a light source for generating a light beam;
a beam irradiating optical system for irradiating said light beam to an optical recording medium having a plurality of tracks to form at least one beam spot having substantially a single track width, onto said tracks in a track transverse direction;
a photo detector arranged in a corresponding direction corresponding to said track transverse direction, and having a pair of photo detecting elements for receiving respectively returning light from said at least one beam spot;
first positional-shift signal generating means for generating a first positional-shift signal which expresses shift in position in said track transverse direction from a first reference position within each of said tracks, on the basis of an output from said pair of photo detecting elements;
a second photo detecting element provided on said photo detector and arranged in said corresponding direction which is different from said pair of photo detecting elements for receiving the returning light from said at least one beam spot;
second positional-shift signal generating means for generating a second positional-shift signal which expresses shift in position from a second reference position which is different from said first reference position, within each of said tracks by the use of an output from said second photo detecting element;
selecting means for selecting said first and second positional shift signals; and
tracking control means for controlling a moving amount of said beam irradiating optical system in the track transverse direction by the use of the selected positional-shift signal selected by said selecting means, to retain a position of said at least one beam spot to a position corresponding to said first or second reference position.

* * * * *